United States Patent
Haynes

(10) Patent No.: US 11,958,410 B2
(45) Date of Patent: *Apr. 16, 2024

(54) ARTIFICIALLY INTELLIGENT MOBILITY SAFETY SYSTEM

(71) Applicant: VELO.AI, INC., Pittsburgh, PA (US)

(72) Inventor: Galen Clark Haynes, Pittsburgh, PA (US)

(73) Assignee: VELO AI, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,249

(22) Filed: Apr. 25, 2023

(65) Prior Publication Data

US 2023/0339395 A1 Oct. 26, 2023

Related U.S. Application Data

(63) Continuation of application No. 18/137,835, filed on Apr. 21, 2023.
(Continued)

(51) Int. Cl.
*B60Q 9/00* (2006.01)
*G08G 1/01* (2006.01)
*G08G 1/16* (2006.01)

(52) U.S. Cl.
CPC ............ *B60Q 9/008* (2013.01); *G08G 1/0133* (2013.01); *G08G 1/16* (2013.01)

(58) Field of Classification Search
CPC .............................. B60Q 9/008; G08G 1/0133
(Continued)

(56) References Cited

U.S. PATENT DOCUMENTS 5,005,661 A 4/1991 Taylor et al.
5,168,136 A * 12/1992 Thangavelu .......... B66B 1/2466
187/247
(Continued)

FOREIGN PATENT DOCUMENTS

CN 111418238 7/2020
DE 102017204496 9/2018
(Continued)

OTHER PUBLICATIONS

"Garmin patents rear-view bike camera triggered by approaching dangers", road.cc content tech-news garmin-patents-bike-camera-triggered-approaching-dangers-291121, (Mar. 16, 2022), 4 pgs.
(Continued)

*Primary Examiner* — Kerri L McNally
*Assistant Examiner* — Thang D Tran
(74) *Attorney, Agent, or Firm* — SCHWEGMAN LUNDBERG & WOESSNER, P.A.

(57) ABSTRACT

In some examples, a mobility safety system includes a real-time data capturing component to capture data relating to conditions within a traffic environment using at least one of a camera, a radar sensor, a LiDAR sensor, a proximity sensor, an inertial measurement unit (IMU), and a global positioning system (GPS), at least one trained model to generate a risk estimation related to a mobility platform within the traffic environment, the at least one trained model being trained using at least one of supervised, unsupervised and semi-supervised learning, a risk estimation component to generate the risk estimation, and an alert activation component to generate a first alert directed at an operator of the mobility platform based on the risk estimation.

16 Claims, 15 Drawing Sheets

Related U.S. Application Data

(60) Provisional application No. 63/333,682, filed on Apr. 22, 2022.

(58) Field of Classification Search
USPC .......................................................... 340/435
See application file for complete search history.

(56) References Cited

U.S. PATENT DOCUMENTS

| | | | |
|---|---|---|---|
| 5,781,145 | A | 7/1998 | Williams et al. |
| 6,731,202 | B1 | 5/2004 | Klaus |
| 7,061,372 | B2 | 6/2006 | Gunderson et al. |
| 7,079,024 | B2 | 7/2006 | Alarcon |
| 9,449,518 | B2 | 9/2016 | Mochizuki et al. |
| 10,216,189 | B1 | 2/2019 | Haynes |
| 10,304,341 | B1 | 5/2019 | Crasso et al. |
| 10,562,538 | B2 | 2/2020 | Lan et al. |
| 10,579,063 | B2 * | 3/2020 | Haynes ............... G01S 13/931 |
| 10,668,971 | B2 | 6/2020 | Denholm et al. |
| 10,705,105 | B2 | 7/2020 | Mandava et al. |
| 10,730,514 | B2 | 8/2020 | Frederick et al. |
| 10,899,408 | B2 | 1/2021 | Gilles |
| 11,105,920 | B2 | 8/2021 | Brisimitzakis et al. |
| 11,113,972 | B2 | 9/2021 | Clyne et al. |
| 11,140,515 | B1 | 10/2021 | Voss et al. |
| 11,170,650 | B2 | 11/2021 | Cooper |
| 11,220,258 | B2 | 1/2022 | Cordova et al. |
| 2002/0169533 | A1* | 11/2002 | Browne ................ B60R 21/013 701/45 |
| 2003/0201929 | A1* | 10/2003 | Lutter .................. G01S 13/931 342/72 |
| 2005/0248453 | A1* | 11/2005 | Fechter ................ G08B 25/016 340/539.15 |
| 2008/0186382 | A1 | 8/2008 | Tauchi et al. |
| 2009/0033475 | A1 | 2/2009 | Zuziak et al. |
| 2010/0225521 | A1 | 9/2010 | Mochizuki |
| 2013/0127638 | A1 | 5/2013 | Harrison |
| 2013/0245945 | A1 | 9/2013 | Morita et al. |
| 2013/0293396 | A1 | 11/2013 | Selevan |
| 2015/0025789 | A1 | 1/2015 | Einecke et al. |
| 2015/0124096 | A1 | 5/2015 | Koravadi |
| 2015/0228066 | A1* | 8/2015 | Farb ....................... G06V 20/58 348/148 |
| 2016/0084942 | A1 | 3/2016 | Mizutani et al. |
| 2016/0363665 | A1 | 12/2016 | Carlson et al. |
| 2018/0074200 | A1 | 3/2018 | Liu et al. |
| 2018/0222473 | A1* | 8/2018 | Shami .................. B60W 50/14 |
| 2018/0286217 | A1* | 10/2018 | Guido ................... G08B 25/10 |
| 2019/0018129 | A1 | 1/2019 | Walker et al. |
| 2019/0025336 | A1* | 1/2019 | Mandava .............. G01S 7/4808 |
| 2019/0111921 | A1* | 4/2019 | Hehn ..................... G01C 21/30 |
| 2019/0303457 | A1* | 10/2019 | Eade ................. G01C 21/3848 |
| 2019/0304097 | A1* | 10/2019 | Eade ....................... G06T 7/162 |
| 2019/0331791 | A1* | 10/2019 | Brisimitzakis ............ G01S 7/24 |
| 2020/0026722 | A1* | 1/2020 | Eade ........................ G06T 7/33 |
| 2020/0160070 | A1* | 5/2020 | Sholingar ................ G06T 7/70 |
| 2020/0223506 | A1* | 7/2020 | Gilles .................... B62J 45/414 |
| 2020/0326179 | A1* | 10/2020 | Tong .................... G01B 11/026 |
| 2020/0393261 | A1* | 12/2020 | Zhang .................. G08G 1/0133 |
| 2020/0394911 | A1* | 12/2020 | Harmel ................ G05D 1/0287 |
| 2021/0009163 | A1* | 1/2021 | Urtasun .................... G08G 1/20 |
| 2021/0089938 | A1* | 3/2021 | Ariannezhad .... G08G 1/096775 |
| 2021/0197720 | A1* | 7/2021 | Houston ................ G06N 3/045 |
| 2021/0200222 | A1* | 7/2021 | Zhu .................. G08G 1/096775 |
| 2021/0312811 | A1* | 10/2021 | Ohlarik ..................... G06N 5/04 |
| 2021/0403001 | A1* | 12/2021 | Del Pero ............ G01C 21/3815 |
| 2022/0200653 | A1* | 6/2022 | Jia ......................... H04B 1/7073 |
| 2022/0223037 | A1* | 7/2022 | Xu ......................... G06N 3/084 |
| 2022/0326023 | A1* | 10/2022 | Xu ..................... G01C 21/3807 |
| 2023/0339394 | A1 | 10/2023 | Haynes |

FOREIGN PATENT DOCUMENTS

| | | |
|---|---|---|
| DE | 202018005712 | 1/2019 |
| DE | 102018009618 | 6/2020 |
| EP | 3872529 | 9/2021 |
| GB | 2558235 | 5/2019 |
| IT | 201900019268 | 4/2021 |
| JP | 7003633 | 1/2022 |
| KR | 102384744 | 4/2022 |
| WO | 2017113803 | 7/2017 |
| WO | 2021081371 | 4/2021 |
| WO | 2023205444 | 10/2023 |

OTHER PUBLICATIONS

Howard, Andrew G., "MobileNets: Efficient Convolutional Neural Networks for Mobile Vision Applications", arXiv:1704.04861v1, (Apr. 17, 2017), 9 pgs.

Kumar, Sumit, "Interaction-based trajectory prediction over a hybrid traffic graph", arXiv:2009.12916v1, (Sep. 27, 2020), 12 pgs.

Liu, Xianpeng, "Learning auxiliary monocular contexts helps monocular 3D object detection", Proceedings of the AAAI Conference on Artificial Intelligence, vol. 36, No. 2, (2022), 9 pgs.

Liu, Zechen, "Smoke: Single-stage monocular 3d object detection via keypoint estimation", Computer Vision Foundation, (2020), 10 pgs.

Rainmaker, DC, "Hands-On with Backtracker: Radar for your bike", [Online]. Retrieved from the Internet: https: www.dcrainmaker.com Jul. 2014 hands-on-backtracker-radar.html, (Jul. 25, 2014), 3 pgs.

Rainmaker, DC, "Cycliq Fly6 In-Depth Review", dcrainmaker.com Oct. 2015 cycliq-fly6-review.html, (Oct. 29, 2015), 26 pgs.

Rainmaker, DC, "Cycliq Fly12 Bike Light Camera In-Depth Review", dcrainmaker.com May 2016 cycliq-fly12-bike-lightcamera-in-depth-review.html, (May 18, 2016), 57 pgs.

Rainmaker, DC, "First Look at Fly6 HD Camera and Tail-Light Combo", dcrainmaker.com Feb. 2014 fly6-hd-camera-light.html, (Feb. 11, 2014), 18 pgs.

Rapp, Jordan, "2011 Interbike: Cerevellum Hindsight 35", [Online]. Retrieved from the Internet: https: www.slowtwitch.com Products 2011_Interbike_Cerevellum_Hindsight_35_2349.html, (Sep. 24, 2011), 6 pgs.

Redmon, Joseph, "You only look once: Unified, real-time object detection", CVPR, 2016, [Online]. Retrieved from the Internet: URL: URL:https: arxiv.org pdf 1506.02640, (May 9, 2016), 10 pgs.

"International Application Serial No. PCT US2023 019443, International Search Report dated Jul. 28, 2023", 5 pgs.

"International Application Serial No. PCT US2023 019443, Written Opinion dated Jul. 28, 2023", 4 pgs.

Haynes, Clark G., "Developing a Robust Disaster Response Robot: CHIMP and the Robotics Challenge", Journal of Field Robotics 34, No. 2, (Feb. 16, 2017), 41 pgs.

Haynes, Clark G., "Laboratory on legs: an architecture for adjustable morphology with legged robots", Proceedings vol. 8387, Unmanned Systems Technology XIV, (Jun. 12, 2012), 16 pgs.

Jeon, Woongsun, "A Smart Bicycle That Protects Itself Active Sensing and Estimation for Car-Bicycle Collision Prevention", IEEE Control Systems, IEEE, USA, vol. 41, No. 3,, (Jun. 1, 2021), 74 pgs.

Stentz, Anthony, "Chimp, the CMU Highly Intelligent Mobile Platform", Journal of Field Robotics 32(2), (2015), 20 pgs.

Tan, Mingxing, "EfficientNet: Rethinking Model Scaling for Convolutional Neural Networks", arXiv:1905.11946v5 [cs.LG], (Sep. 11, 2020), 11 pgs.

Zhang, Lingyao, "Map-Adaptive Goal-Based Trajectory Prediction", 4th Conference on Robot Learning, (2020), 13 pgs.

* cited by examiner

ARTIFICIALLY INTELLIGENT MOBILITY SAFETY SYSTEM

CLAIM OF PRIORITY

This application is a continuation of and claims the benefit of priority under 35 U.S.C. § 120 to U.S. patent application Ser. No. 18/137,835, filed on Apr. 21, 2023, which claims the benefit of priority under 35 U.S.C. § 119(e) to U.S. Provisional Patent Application Ser. No. 63/333,682, filed on Apr. 22, 2022, each of which is incorporated by reference herein in its entirety.

BACKGROUND

Road biking in the presence of cars can pose significant dangers to cyclists. The high speed and weight of cars create a serious risk of injury or death in the event of an accident. According to the National Highway Traffic Safety Administration (NHTSA), in 2020, 846 bicyclists were killed in traffic crashes in the United States, with cars being a major contributor. Additionally, a total of 48,000 bicyclists were injured in motor vehicle crashes in the same year.

Road biking in the presence of cars can be an extremely hazardous activity, with numerous dangers and risks to cyclists. Cars are significantly larger, faster, and more powerful than bicycles, making them a major threat to the safety of cyclists. When cars and bicycles share the road, there is an elevated risk of accidents, collisions, and injuries.

While there are existing solutions to improve road bike safety, such as lights, reflectors, helmets, and high-visibility clothing, these solutions have technical limitations that may reduce their effectiveness. For example, while lights and reflectors can improve visibility, they may not provide proactive hazard avoidance features such as collision detection. Additionally, helmets may reduce the severity of injuries in the event of an accident, but cannot prevent accidents from occurring in the first place. As a result, there is a pressing need for more effective and advanced safety solutions that can better mitigate the risks associated with road biking in traffic conditions.

BRIEF DESCRIPTION OF THE SEVERAL VIEWS OF THE DRAWINGS

Certain figures are included in the text below and others are attached. To easily identify the discussion of any particular element or act, the most significant digit or digits in a reference number refer to the figure number in which that element is first introduced.

DETAILED DESCRIPTION

Examples of artificially intelligent mobility safety systems are described, which use artificial intelligence to enhance the safety of bicyclists and other road users.

In some examples, the safety system comprises a smart bike light that incorporates artificial intelligence (AI) algorithms. Example systems seek to prevent traffic incidents by providing early warning signals and alerts to users, based on a combination of hardware and sensors, AI algorithms, and alert mechanisms.

Hardware components include several sensors and communication modules, such as light sensors and proximity sensors, which are capable of detecting and analyzing data from the surrounding environment. The data collected by the sensors is analyzed by an advanced AI algorithm, which incorporates machine learning techniques to predict potential hazards and alert users accordingly.

Example systems also include an alert mechanism (or mechanisms) that provides users with warnings in the event of potential hazards. The alert mechanism may comprise a visual or audible alert, or a combination of both, depending on the situation. Additionally, the system is designed to provide users with an intuitive interface that enables them to quickly and easily access critical information about their surroundings.

In operation, example safety systems are capable of identifying potential hazards and providing users with advance warning signals to prevent accidents and injuries. The system's AI algorithms enable it to adapt to changing traffic conditions and provide real-time alerts to users.

In summary, the described examples provide an innovative and technologically advanced mobility safety system that utilizes artificial intelligence to enhance the safety of bicyclists and other road users. The system's unique combination of hardware and software components, along with an intuitive user interface, provides a powerful and effective tool for preventing accidents and improving road safety.

Figure 1:
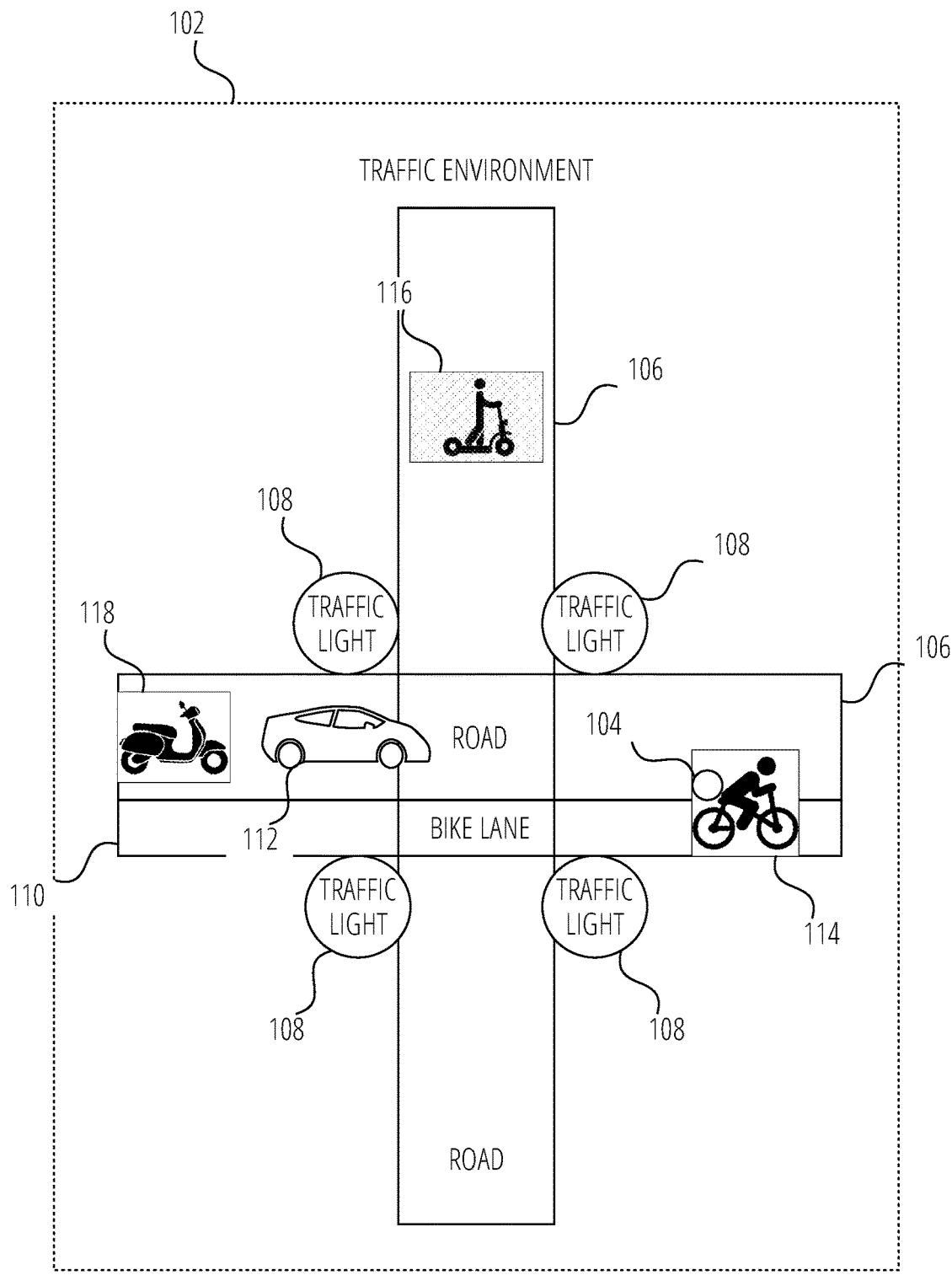
FIG. 1 is a diagrammatic representation of a traffic environment, according to some examples, within which a mobility safety system may be deployed, as part of a broader traffic safety system

FIG. 1 is a diagrammatic representation of a traffic environment 102, according to some examples, within which a mobility safety system 104 may be deployed, as part of a broader traffic safety system. The traffic environment 102 includes a number of objects and features, the objects including stationary object (e.g., traffic lights, lamp posts, curbs, speed bumps etc.) and mobile objects, which include actors within the traffic environment 102.

As examples of stationary objects and features, the traffic environment 102 is shown to include infrastructure including intersecting roads 106. A collection of traffic lights 108 operate to control traffic flow at the intersection between the roads 106. The traffic environment 102 also includes a bike lane 110 that runs parallel to one of the roads 106.

As examples of actors within the traffic environment 102, a number of vehicles are shown to be traversing the roads 106 and bike lanes 110 within the traffic environment 102, these vehicles including cars 112, buses, trucks etc., in addition to a number of mobility platforms (e.g., micromobility platforms or devices, such as bicycles 114, scooters 116, motorbikes 118, skateboards, etc.) Other examples of actors may include pedestrians and animals.

With specific regard to the bicycle 114, this mobility platform has an associated mobility safety system 104, which may be attached to the bicycle 114 itself, a bicycle accessory (e.g., a helmet worn by the cyclist) or to the body of the cyclist. Similar mobility safety systems 104 may be associated with the other illustrated mobility platforms, as well as the other vehicles.

In some examples, the mobility safety systems 104 within the traffic environment 102 may be communicatively coupled using a vehicle-to-vehicle (V2V) communication protocol. V2V communication can enable mobility safety systems 104 to exchange data and information with other vehicles and mobility platforms, allowing them to communicate with each other and exchange data.

For example, the mobility safety systems 104 may use wireless communication protocols, such as Wi-Fi, Bluetooth, or ZigBee, to exchange data and information with other mobility safety systems 104 and vehicles in the traffic environment 102. The V2V communication can also use Dedicated Short Range Communication (DSRC) technology, which is a wireless communication standard designed specifically for V2V communication in intelligent transportation systems. DSRC uses a 5.9 GHz frequency band to exchange safety-critical information between vehicles and other devices in the traffic environment.

In addition to V2V communication, the traffic lights 108 in the traffic environment 102 may also have components, including various sensors such as cameras, LiDAR, radar, and ultrasonic sensors, to collect real-time traffic information and communicate this information to the mobility safety systems 104. For example, the traffic lights 108 may use cameras to capture images of the traffic at the intersection, and the mobility safety systems 104 may use this information to generate alerts and take other actions, as will be described in further detail below.

1. Device Description

Figure 2:
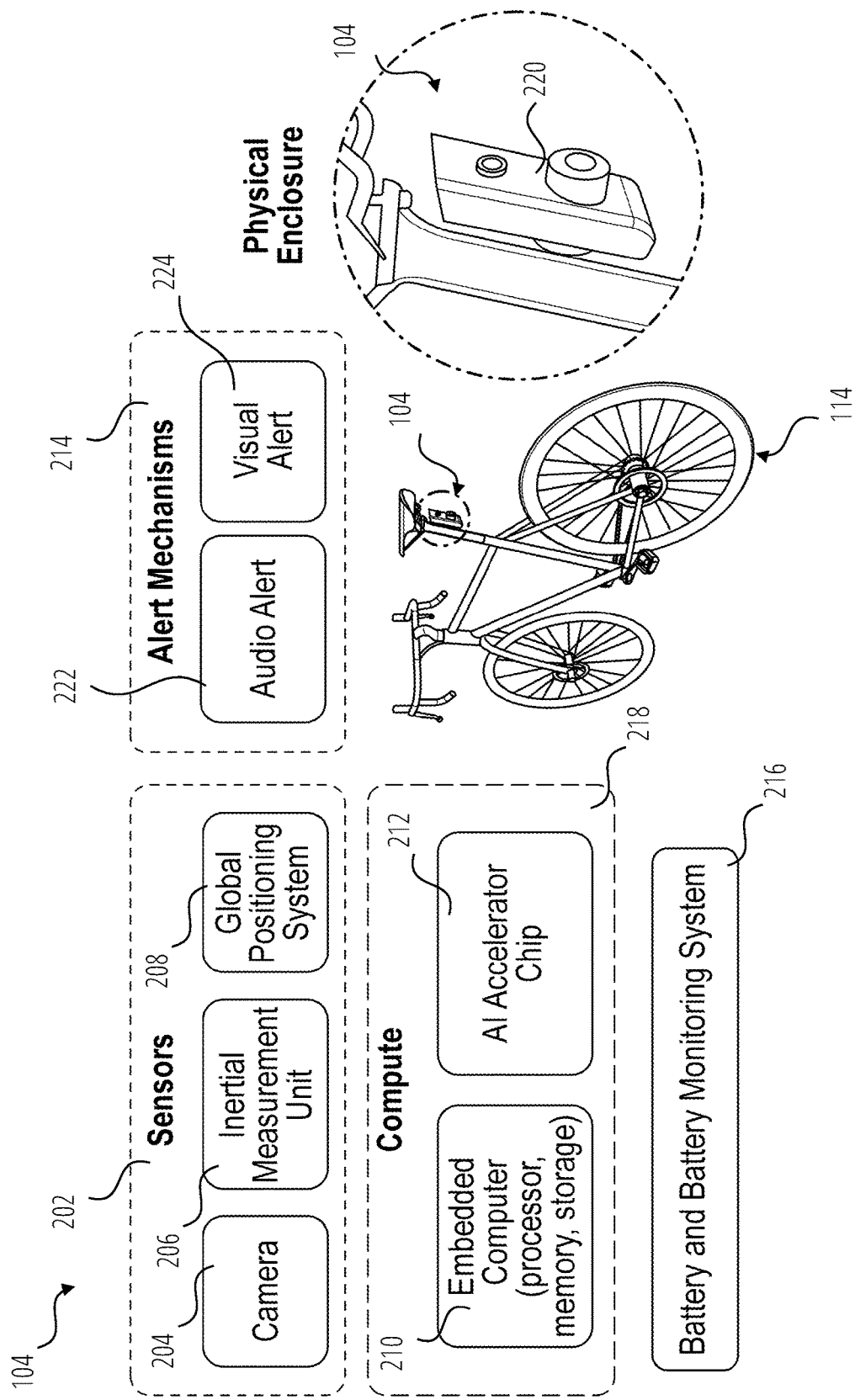
FIG. 2 is a diagrammatic representation of a mobility safety system, according to some examples.

FIG. 2 is a diagrammatic representation of a mobility safety system 104, according to some examples.

The mobility safety system 104 is a fully self-contained device including:
- Sensors 202: exteroceptive (e.g., a camera 204) and interoceptive (e.g., IMU 206, GPS 208).
- Compute modules: embedded computer 210 (e.g., onboard processors and memory) as well as an (Artificial Intelligence) AI accelerator chip 212.
- Algorithms: localization, perception, prediction, and risk estimation, coupled with powerful machine-learned (ML) models, stored and executed by the embedded computer 210.
- Alert mechanisms 214: both auditory and visual means of alerting users.
- Battery and battery monitoring systems 216: capable of powering the device through typical usage.

The mobility safety system 104 uses the sensors 202 and algorithms to provide temporally relevant warnings to traffic participants. The example mobility safety system 104 is described as a safety device mounted directly on a bicycle 114, rather than on a full-size vehicle. The mobility safety system 104 is readily attached to bicycles, scooters, and other mobility platforms and accessories (such as on a user's helmet or worn over clothing). While example mobility safety systems 104 is a bicycle use case is described, but it will be appreciated that the broad applicability toward all forms of mobility and personal transport.

The mobility safety system 104 has a number of modes. In a first mode, the mobility safety system 104 operates as a bike light, providing extra daytime and nighttime illumination for a bicyclist on the street. In further modes of operation, however, the mobility safety system 104 uses sensors 202 and algorithms to analyze its surrounding environment, identify potential hazards and trigger customized warnings based upon specific conditions.

2. Hardware Systems

Example hardware of the mobility safety system 104 includes multiple subsystems allowing self-supported operation, as a single device mounted on a bicycle.

The example mobility safety system 104 consists of numerous sensors 202 and compute modules 218, powered by an onboard battery and battery monitoring system 216 and protected by a physical enclosure 220, and is able to drive various alert mechanisms 214 (including audible audio alerts 222 and visual alerts 224). In addition to audible and visual alerts, the mobility safety system 104 may also provide haptic feedback, such as vibrations, to alert users of potential hazards.

2.1 Physical Enclosure

The physical enclosure 220 of the mobility safety system 104 protects the sensors 202, compute modules 218, battery and battery monitoring system 216 from environmental factors such as dust, debris, and moisture. The enclosure 220 may be made from lightweight and durable materials such as aluminum, polycarbonate, or ABS plastic, which are able to withstand the rigors of daily use.

The enclosure 220 is designed to have multiple mounting options, allowing users to customize the location of the device on their mobility platform, such as the bicycle 114. While the nominal mounting locations are the seat post or handlebars of a bicycle 114, other mounting options can be used as well, depending on the user's preference and the specific requirements of the mobility platform.

Access ports on the physical enclosure 220, such as an environmentally sealed USB-C port, are included to allow users to charge the batteries and perform other necessary functions. These ports may also be used to provide data connectivity, allowing users to connect the mobility safety system 104 to other transport buses besides bicycles, such as e-scooters, hoverboards, or electric skateboards. In addition to the USB-C port, the enclosure 220 could also include other types of ports, such as Ethernet, HDMI, or audio jacks, which could be used for a range of applications, such as data transfer, video output, or audio input/output.

The enclosure 220 may further include other features, such as a status indicator light, which provides visual feedback on the device's operational status, or a physical button, which could be used to trigger certain functions or settings. The enclosure 220 could also include additional protection features, such as shock absorption or waterproofing, to ensure the safety and durability of the device in different environments.

2.2 Battery and Power System

The battery and battery monitoring system 216 provides the necessary power to drive the sensors 202, compute modules 218, and alert mechanisms, and ensures that the mobility safety system 104 is able to operate safely and effectively for extended periods of time.

The mobility safety system 104 is powered using a rechargeable battery, such as Lithium-Ion (Li-Ion) or Lithium Polymer (Li-Po) battery cells, which are located within the enclosure 220. These batteries offer high energy density, and can thus store more energy in a small form factor.

The mobility safety system 104 can be powered via an external bus voltage, such as supplied via a USB-C connector. This feature may be useful if the battery is depleted or if the user needs to charge the battery while the device is in use.

The battery and battery monitoring system 216 is designed to ensure the safety and reliability of the onboard battery system. The battery and battery monitoring system 216 further includes a battery management system (BMS), which is responsible for charging the battery, monitoring current and voltage levels, and preventing over- and under-voltage conditions as necessary. The BMS ensures that the battery is charged optimally and that its performance is maintained over time. The BMS constantly monitors the battery's state of charge, temperature, and voltage, and adjusts the charging rate and voltage as necessary to ensure that the battery is charged safely and efficiently. In addition, the BMS can detect and prevent overcharging or undercharging of the battery, which can cause damage to the battery or reduce its performance over time.

The battery and battery monitoring system 216 can include additional functionality to enhance the performance and safety of the mobility safety system 104. For example, a battery pack enables the batteries to be easily replaceable, allowing users to swap out the battery pack when needed. This can be particularly useful if the device is being used for extended periods of time or if the battery is depleted and needs to be replaced quickly.

The battery and battery monitoring system 216 may further include battery level indicators, which provide users with real-time feedback on the battery's state of charge, and low battery alerts, which notify users when the battery is running low and needs to be recharged or replaced. Additionally, the battery and battery monitoring system 216 may support fast charging or wireless charging, which can help to reduce the amount of time required to charge the mobility safety system 104 and increase its overall convenience and usability.

2.3 Sensors

In some examples, the mobility safety system 104 uses one or more cameras 204, inertial measurement units (IMUs 206), and global positioning systems (GPSes 208) as a set of sensors. Further example configurations may include additional sets of sensors (e.g., multiple cameras) and different sensor modalities (e.g., the addition of range sensors such as LiDAR, radar, and ultrasonic sensors).

Camera 204

Some examples of the mobility safety system 104 may include a single camera 204 or cameras 204, which may be incorporated into the mobility safety system 104 to improve the Field of View (FOV) or to allow an expanded operational domain.

Each of the cameras 204 may be a CMOS (Complementary Metal-Oxide-Semiconductor) camera. CMOS cameras offer high-speed, low-power operation and good image quality and sensitivity in low-light conditions. Another type of camera that may be used is a CCD (Charge-Coupled Device) camera. CCD cameras are known for their high image quality and low noise levels.

Operational parameters of the cameras 204 can also be customized based on the specific requirements of the mobility safety system 104. For example, the frame rate can be increased or decreased depending on the amount of visual data that needs to be captured. As noted above, a high frame rate of 30-60 Hz may be used. The resolution of the cameras 204 can also be customized. A high-resolution camera with 1920×1080 or more pixels per video frame can be used to capture detailed visual data of the traffic environment. This can be useful in detecting and tracking small objects or features. In order to prevent motion blur when the mobility safety system 104 is in motion, a fast shutter speed of 5 to 15 msec can be used. This ensures that the visual data captured by the camera 204 is clear and usable for analysis.

A wide field of view lens can also be used to allow the cameras 204 116 to observe a large enough area around the mobility safety system 104 in order to capture and visually track multiple traffic participants. This can be useful in detecting and tracking multiple objects or participants in the environment.

Inertial Measurement Unit (IMU 206)

The mobility safety system 104 uses several sensors to estimate the ego-motion of the mobility safety system 104 and an ego-vehicle (e.g., the bicycle 114) to which the mobility safety system 104 is attached to. These sensors include a 3-axis accelerometer, a 3-axis gyroscope, and a 3-axis magnetometer.

The 3-axis accelerometer estimates the effect of accelerations on the mobility safety system 104, including gravity when the device is stationary, thus providing data on the orientation of the device.

The 3-axis gyroscope estimates the angular rates of the mobility safety system 104 in motion. These estimates may be used to determine the rotation of the mobility safety system 104 and the bicycle 114 to which it is mounted. The gyroscope can also be used to estimate the orientation of the mobility safety system 104 in the absence of other sensors.

The 3-axis magnetometer provides estimates of nearby magnetic fields, pointing to magnetic north when not in the presence of any other magnetic disturbances. This magnetometer thus provides data on the orientation of the device relative to the Earth's magnetic field.

An alternative or supplemental accelerometer may be a piezoelectric accelerometer. This type of accelerometer uses piezoelectric materials to measure changes in acceleration.

An alternative or supplemental gyroscope is the fiber optic gyroscope. This type of gyroscope uses the interference of light beams in a fiber optic coil to measure angular velocity In addition to the magnetometer, other sensors can be used to provide magnetic field measurements.

Global Positioning System (GPS 208)

To provide localization, the mobility safety system 104 uses a global positioning system. The mobility safety system 104 receives data from satellites orbiting the Earth, triangulates its position on Earth based upon this data, and provides this raw localization information to the software systems.

2.4 Onboard Compute (Compute Modules 218)

Example mobility safety systems 104 use embedded systems to fully support compute requirements, consisting of an embedded computer 210, capable of running a full operating system and application layer, along with an AI accelerator chip 212, to rapidly process data using ML systems.

Embedded Computer 210

An embedded computer 210, in some examples consisting of either a single-board computer (SBC) or a System-on-Module (SoM) attached to the carrier board, provides computational capabilities. An SBC may be a complete computer built on a single circuit board, with microprocessors, memory, input/output interfaces, and other components required for its operation. A SoM may include at least microprocessor or microcontroller, Random Access Memory (RAM), flash memory, and input/output interfaces such as General-Purpose Input/Output (GPIO), Universal Asynchronous Receiver-Transmitter (UART), Serial Peripheral Interface (SPI), Inter-Integrated Circuit (I2C), Universal Serial Bus (USB), Ethernet, and Wireless Fidelity (Wi-Fi). A SoMs may also include additional components such as sensors, audio and video codecs, power management ICs, and security features. A SoMs may also be mounted on a carrier board, which provides additional hardware and interfaces.

An operating system, loaded with software to operate the mobility safety system 104, enables functionality such as described below. Interfaces between the embedded computer 210 and sensors 202 retrieve sensor data, and data storage components allow sensor data (and its derivatives) to be stored for future use. Onboard wireless communications, via Wi-Fi, Bluetooth, and LoRa, allow the computer to communicate with devices external to the mobility safety system 104.

AI Accelerator Chip 212

In addition to the embedded computer 210, an Artificial Intelligence AI accelerator chip 212 is used to perform fast processing of data to make inferences using ML models. AI accelerator chips 212 are customized to perform mathematical operations and provide significant benefits in terms of computation per watt of supplied power, thus improving the overall power efficiency of the mobility safety system 104 when running off of battery power.

The embedded computer 210 and AI accelerator chip 212 of the mobility safety system 104 operate together to share the processing of data, with the embedded computer 210 handling the general-purpose computing tasks and the AI accelerator chip 212 handling specialized machine learning tasks.

The embedded computer 210 includes a Central Processing Unit (CPU), memory, and various input/output interfaces, such as Universal Serial Bus (USB), Ethernet, and General Purpose Input/Output (GPIO) pins. The embedded computer 210 is responsible for running the operating system and software stack for the mobility safety system 104. This software stack includes drivers for sensors 202 and other input/output devices, as well as algorithms for processing sensor data and making decisions based on that data.

The AI accelerator chip 212 is responsible for accelerating machine learning algorithms, and can perform certain operations faster and with less power consumption than the CPU in the embedded computer 210. The AI accelerator chip 212 may have multiple cores optimized for matrix multiplication and other mathematical operations used in machine learning, as well as specialized memory and interconnects to facilitate efficient data transfer.

In the mobility safety system 104, the embedded computer 210 and AI accelerator chip 212 can work together in a few different ways. In some examples, the embedded computer 210 preprocess sensor data and prepares this data for input to the AI accelerator chip 212. This may include scaling and normalizing the data, or converting it to a different format that is more amenable to the machine learning algorithms running on the AI accelerator chip 212.

Once the data is prepared, it can be passed to the AI accelerator chip 212 for processing. The AI accelerator chip 212 then performs the machine learning computations required for tasks such as object detection, and estimation, and returns the results to the embedded computer 210 for further processing or decision-making.

In some examples, the embedded computer 210 and AI accelerator chip 212 may operate in a pipelined fashion, where the embedded computer 210 handles some initial processing of the sensor data, and then passes it to the AI accelerator chip 212 for further processing. This approach can help to reduce the overall latency of the system, as the AI accelerator chip 212 can perform certain computations much faster than the CPU in the embedded computer 210.

The use of an embedded computer 210 and AI accelerator chip 212 together in the mobility safety system 104 allows for a flexible and efficient architecture that can balance general-purpose computing with specialized machine learning tasks, and may provide a high-performance, low-power solution for processing sensor data and making decisions in real time.

3. Alert Mechanisms

In some examples, the mobility safety system 104 provides customized alerts to traffic participants. These alerts include both audible and visual methods to seek the attention of nearby road users.

Figure 3:
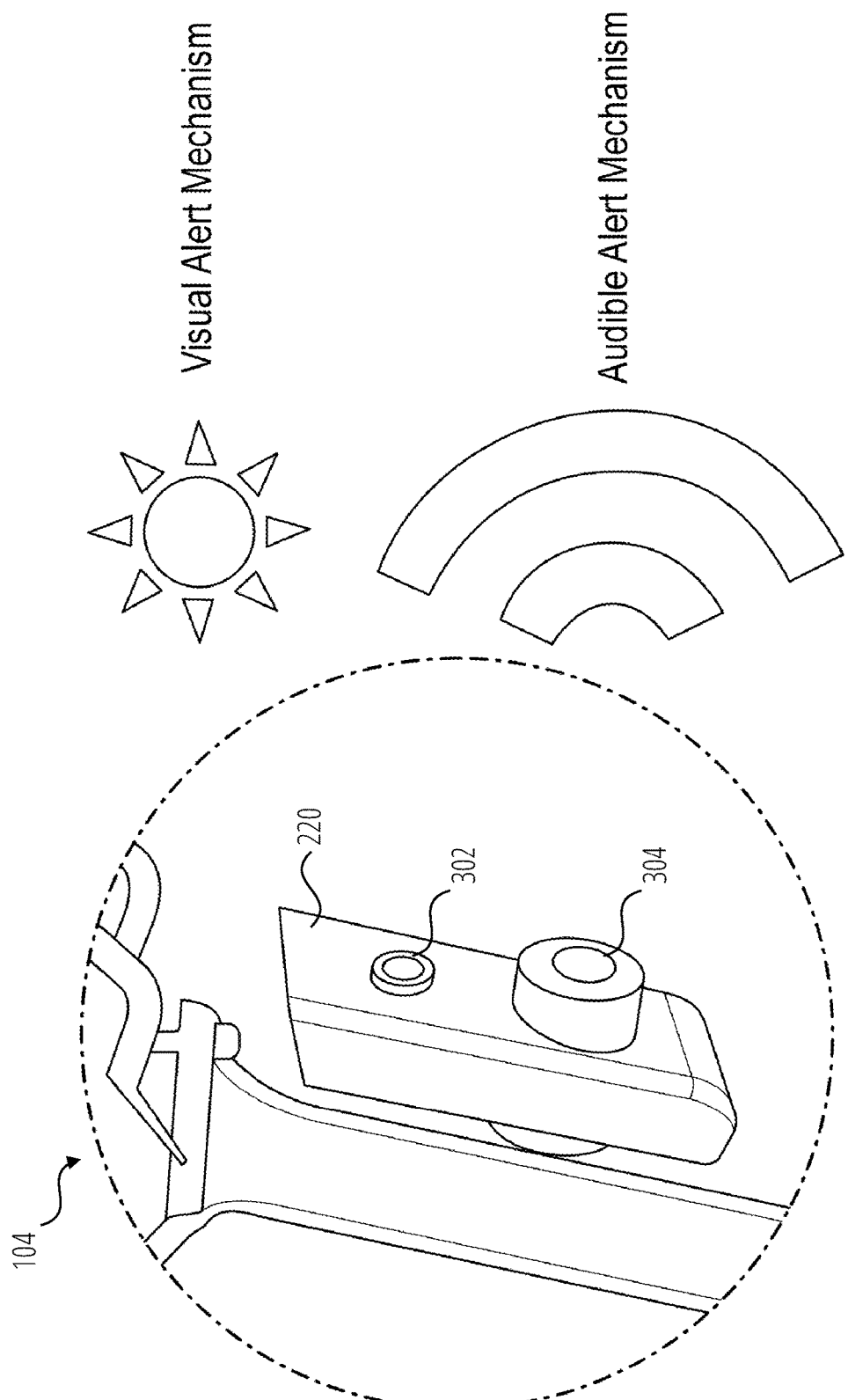
FIG. 3 is side-perspective view of the mobility safety system, showing the enclosure having mounted and secured therein an audio generation device in the form of a speaker and a light generation device in the form a Light Emitting Diode.

FIG. 3 is side-perspective view of the mobility safety system 104, showing the enclosure 220 having mounted and secured therein an audio generation device in the form of a speaker 302 and a light generation device in the form a Light Emitting Diode (e.g., LED 304). The LED 304 provides both a wide field of view coverage as well as a brighter, directed beam in a specific direction, turns on and off at a desired pattern and frequency. Onboard software modulates the intensity, pattern, and frequency of light emitted from the LED 304 based upon specific conditions, for instance, shining brighter or changing more rapidly to raise alarm when a nearby traffic actor approaches.

Audible signals generated by the speaker 302 provide an additional ability to alert both the bicyclist and nearby actors in specific scenarios. A first mode of operation provides loud alerts (e.g., >=80 dB at 1 meter of distance) that can be heard by both the bicyclist and other actors. A second mode of operation provides critical audio alerts (e.g., >=100 dB at 1 meter of distance), reserved for the most dangerous scenarios and to ensure vehicle operators can hear the alerts from inside of a closed vehicle. Similar to the light-generating device, the audio generating device may be directed in specific directions based on mount location. For a mobility safety system 104 with sensors 202 looking backward at approaching vehicles, the audio-generating device is similarly pointed backward.

In the second mode of operation, the audio generating device in the mobility safety system 104 is able to alert drivers in closed vehicles by providing audio alerts that are louder and more attention-grabbing. In some examples, the audio generating device may be a horn or a siren that is capable of generating high-decibel sounds that can be heard over the noise inside a closed vehicle.

For example, a horn may be mounted on the mobility safety system 104, The horn may generate a sound at a dB range of around 112-130 dB, which is loud enough to be heard inside a closed vehicle. The horn could be directed in a specific direction based on the mount location, such as backward to alert approaching vehicles.

In some examples, a siren may be used to generate a distinct, attention-grabbing sound. A siren can be louder than a horn, with a typical range of 120-140 dB. The siren may also be directed in a specific direction based on the mount location, such as backward to alert approaching vehicles. In addition to speakers, horns, and sirens, other audio generating devices that may be used for this purpose include buzzers, beepers, and alarms. These devices can generate loud, attention-grabbing sounds that can alert drivers in closed vehicles.

4. Software Architecture

A software architecture of the mobility safety system 104, according to some examples, is defined as a compute graph for purposes of processing sensor information and identifying scenarios, built on top of software infrastructure with underlying capabilities and interfaces to hardware.

Figure 4:
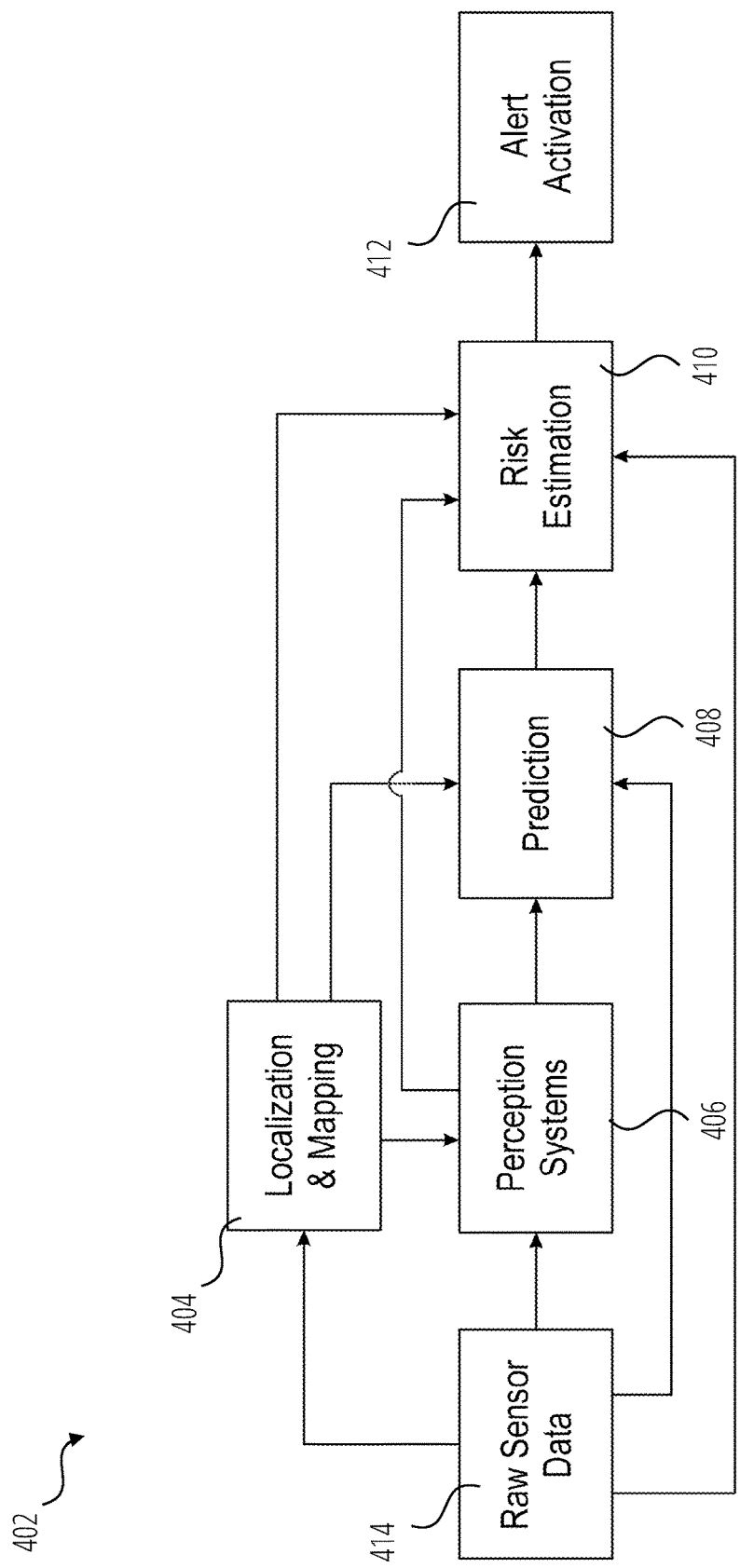
FIG. 4 is a compute graph representation of a software architecture of a mobility safety application, according to some examples, which executes on the mobility safety system.

FIG. 4 is a compute graph representation of a software architecture of a mobility safety application 402, according to some examples, which executes on the mobility safety system 104. Each architecture component takes as input a subset of upstream components in order to produce data streams for downstream components. FIG. 4 illustrates several example algorithmic components, namely a localization and mapping component 404, a perception system 406, a prediction component 408, a risk estimation component 410, and alert activation component 412. The localization and mapping component 404 and the perception system 406 are shown to receive raw sensor data 414 from the various sensors 202 described with reference to FIG. 2. These application layer components are described below, followed by details on a Machine Learning approach and the overall software infrastructure upon which the mobility safety system 104 is built.

4.1. Localization and Mapping

Figure 5:
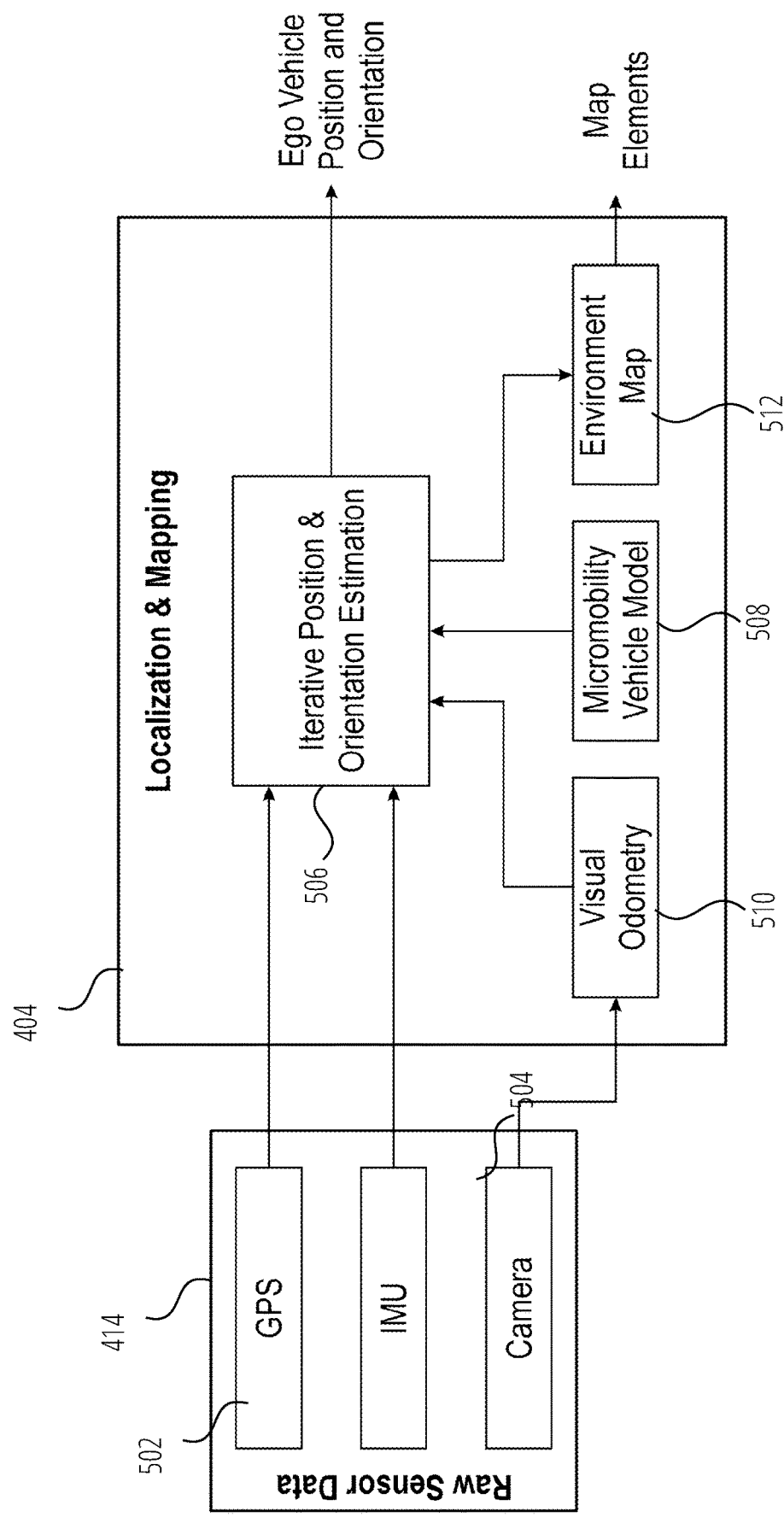
FIG. 5 illustrates how a localization and mapping component uses raw sensor data to continuously refine estimates of the ego-motion of the user, as well as to use and refine a map of the traffic environment, according to some examples.

FIG. 5 illustrates how the localization and mapping component 404 uses raw sensor data 414 to continuously refine estimates of the ego-motion of the user, as well as to use and refine a map of the traffic environment 102. The localization and mapping component 404 outputs include a fully refined estimate of the ego-vehicle position and orientation (and derivatives), and a set of map elements, identifying nearby objects in the environment (e.g., the traffic environment 102).

The localization and mapping component 404 provides a localization capability to the mobility safety system 104 to estimate its location (e.g., position, orientation) with respect to a fixed or relative coordinate system in the traffic environment 102, including estimation of derivatives of these quantities (e.g., velocity, angular rates, as well as linear and angular accelerations).

The localization and mapping component 404 also provides a capability to the mobility safety system 104 to understand its environment (e.g., the traffic environment 102) well enough to develop and refine an estimate of other fixed objects in the world. Localization and mapping by the localization and mapping component 404 can be performed simultaneously, or can be built on top of each other. In some examples, the mobility safety system 104 device has onboard maps, downloaded from a remote repository and cached in the storage mechanism on the compute modules 218, which can then be used to improve localization capabilities.

Localization, according to some examples, uses output from several components, examples of which include:

Sensors 202: The sensors 202 capture and output the raw sensor data 414, which may be stored within the memory of the compute modules 218 or elsewhere. The GPS 208 provides initialization for the localization process by outputting GPS data 502, while the IMU 206 provides IMU data 504, including real-time readings on how the mobility safety system 104 is moving over time, as measured by accelerometers and gyroscopes.

Pose estimation system 506: Inertial measurements (e.g., linear accelerations, angular rates, and magnetometer readings) are fed to an iterative estimation method (e.g., a Kalman Filter or similar) to provide real-time estimates of the position and orientation of the mobility safety system 104, as well as derivatives of these quantities.

Mobility platform model component 508: In cases where the mobility safety system 104 is rigidly attached to a mobility platform (e.g., bicycle, scooter, or similar), a motion model of the mobility platform is further used as input to the pose estimation system 506. In some examples are as discussed below, the mobility platform is referred to as the ego-vehicle or a mobility device.

Visual Odometry components 510: Odometry based upon exteroceptive sensors (e.g., cameras 204 or other exteroceptive sensors) can be further used as input to the pose estimation system 506.

Figure 6:
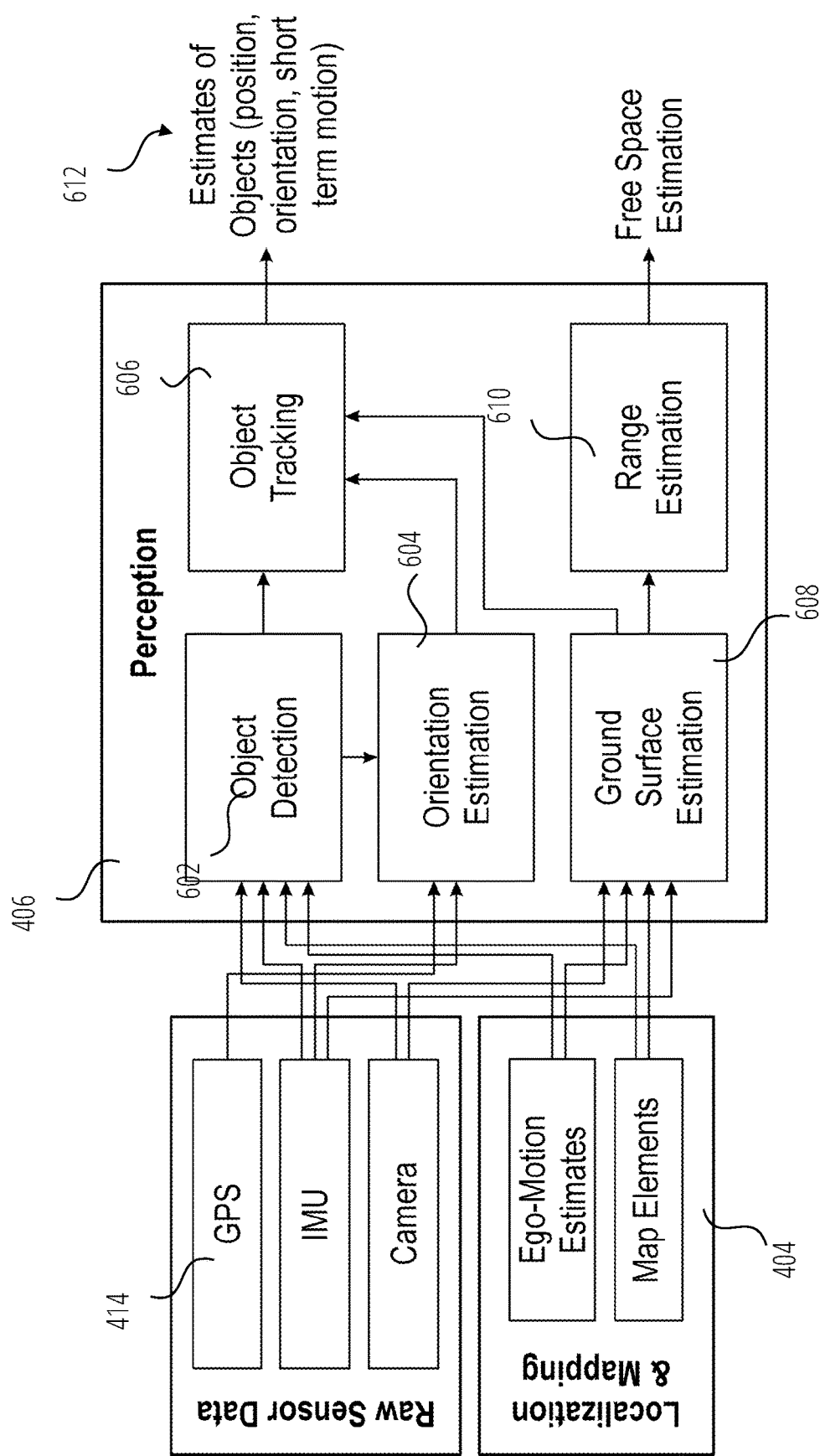
FIG. 6 is a diagrammatic representation of operations and components of the perception system, according to some examples.

The localization and mapping component 404 of the mobility safety system 104 helps determine street surfaces and the surrounding environment, for example by providing estimates of ground surface geometry, road markings, and curb/sidewalk locations (described in more detail with respect to the perception system 406 with reference to FIG. 6). These quantities are stored in an environmental map 512 and further used to improve localization. An existing map can be used to refine the localization and mapping component 404 and localized positions can be used to refine the environmental map 512.

4.2. Perception

FIG. 6 is a diagrammatic representation of operations and components of the perception system 406, according to some examples. At a high-level, the perception system 406 takes raw sensor data 414, as well as localization and map data, to measure and estimate the motion of nearby objects and road users, as well as to estimate the nearby environment (e.g., empty street vs. blockage).

More specifically, the perception system 406 takes sensor data as input (along with possible usage of localization and map data) and attempts to estimate quantifiable properties of the world (e.g., traffic environment 102). Examples of perception tasks include identifying the position, velocity, and geometry of other actors in a traffic environment 102, and estimating attributes of a traffic environment 102, such as identifying obstacles, estimating the ground surface shape, etc.

For the mobility safety system 104, operations of the perception system 406 may include:
- Object detection 602: This includes identification of vehicles in a traffic environment 102, using camera data to estimate the position, orientation, and geometry of objects (e.g., actors such as vehicles, pedestrians, animals etc., or other objects) within a field of view of the camera 204 in a traffic environment 102.
- Orientation estimation 604: Once an actor is detected, the estimate of the orientation is further refined through a comparison of object detections against the ego-vehicle IMU 206 and GPS 208.
- Object tracking 606: By performing detection and estimation of an actor's position and orientation across multiple frames of input sensor data, the perception system 406 can track actors in a traffic environment 102 over time, further estimating quantities such as object motion and instantaneous velocity.
- Ground surface estimation 608: By analyzing the streetscape and scene of a traffic environment 102 surrounding the mobility safety system 104, using the raw sensor data 414 and stored environmental map 512, the perception system 406 provides estimates of the geometry of a road 106, identifying curbs, road paint, street signs, and more, in real-time or near real-time.
- Range estimation 610: The mobility safety system 104 analyzes ground surface results and further uses raw sensor data 414 to estimate distances to actors and/or objects in a traffic environment 102, identifying potential obstacles and also noting free space.

The output of the perception system 406 is object estimate data 612 that includes an estimate of objects in the traffic environment 102 (including, for example, position, orientation, and short-term motion) as well as an estimate of free space in the traffic environment 102.

For perception values, there is generally a known value of truth, e.g., the exact position of an object at a given time or the exact location of the double yellow painted lines down the middle of the street.

4.3. Prediction

Figure 7:
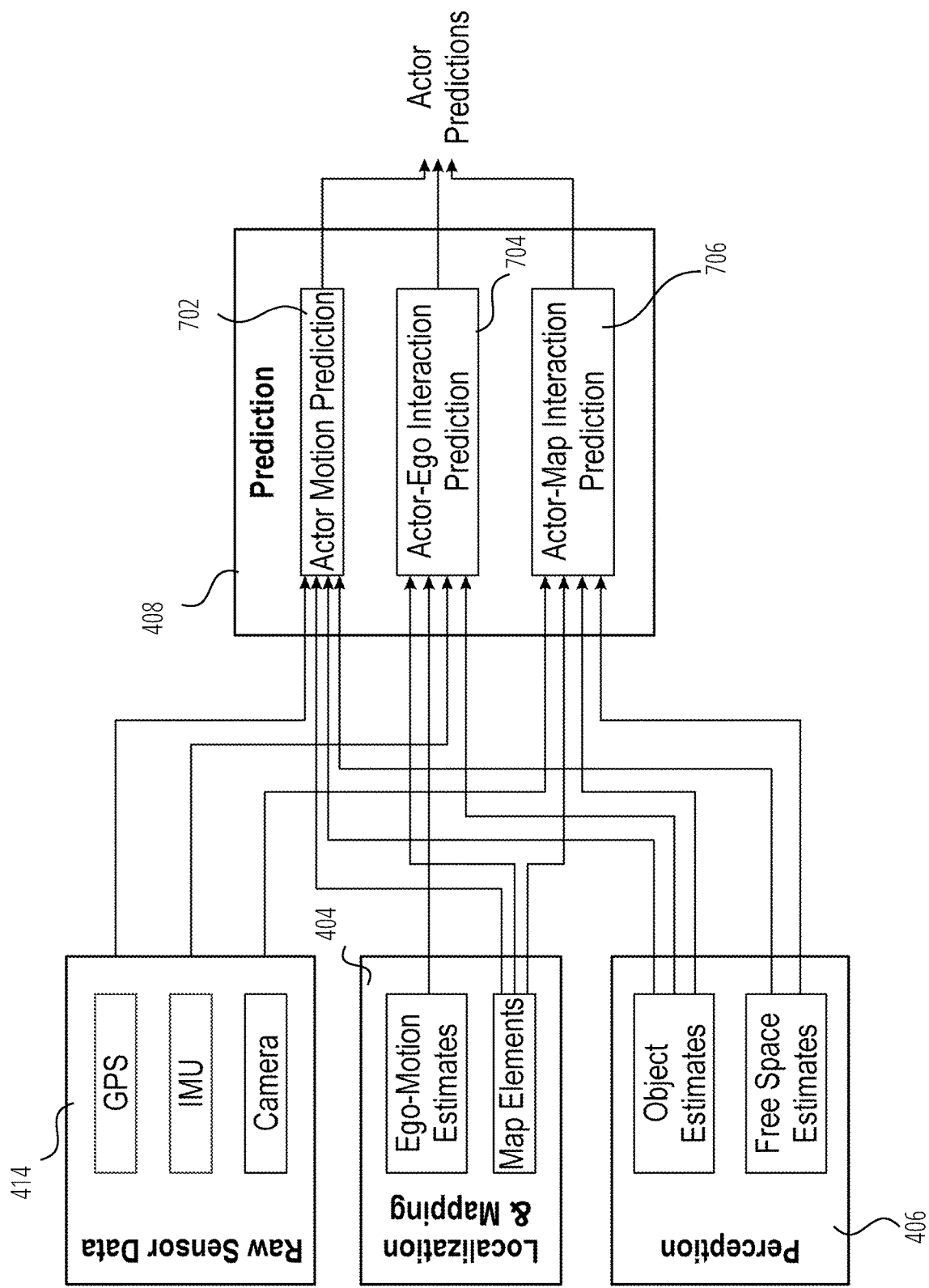
FIG. 7 is a diagrammatic representation of operations and components of the prediction component, according to some examples.

FIG. 7 is a diagrammatic representation of operations and components of the prediction component 408, according to some examples. The prediction component 408 produces estimates of future motion for relevant actors in the scene, including actor-actor interactions (e.g., interactions with the ego-vehicle) as well as interactions with map elements, such as following a curving lane, avoiding an obstacle, etc.

As shown in FIG. 7, the prediction component 408 takes as input raw sensor data 414, localization estimates from the localization and mapping component 404, and perception outputs from the perception system 406 (or any subset thereof) and attempts to forecast the future motion of other actors and objects in a traffic environment 102. A prediction component 408 may process current and past motion states of other actors in various traffic environments 102 in order to predict future motion that the actor is most likely to take. There exist multiple technical challenges with prediction operations of the prediction component 408, namely that wrong answers can still be correct (e.g., the actor zigged, but it was also a perfectly good possibility that they would zag) and that an actor's future motion can likely be altered by the future actions of other actors, including the safety system users themselves.

The prediction component 408 may use perception data as input, along with localization and mapping data, however some models may operate to infer prediction results directly from the raw sensor data 414, using multiple observations of a scene in order to directly predict possible future outcomes.

Example components of the prediction component 408 include:
- Actor Motion Prediction component 702: This system uses perception object estimates, sensor data, and map elements to predict how actors will move over time, through the world.
- Actor-Ego Interaction Prediction component 704: This system analyzes how actors interact with each other as well as interact with the ego-vehicle (e.g., slowing down, speeding up, steering left or right to avoid one another) in order to predict likely outcomes.
- Actor-Map Interaction Prediction component 706: This component predicts how actors move relative to fixed infrastructure, such as following lanes, obeying traffic rules, etc.

The output of the prediction component 408 consists of enumerating future motion possibilities for other actors in the scene, in particular focusing on safety-relevant scenarios. For a vehicle approaching the ego-vehicle from behind, this could include noting the approaching vehicle may choose to pass a slow-moving user of the mobility safety system 104, may decelerate to continue following the user, or may approach aggressively at speed. All three of these are likely different scenario outcomes.

4.4. Risk Estimation

Figure 8:
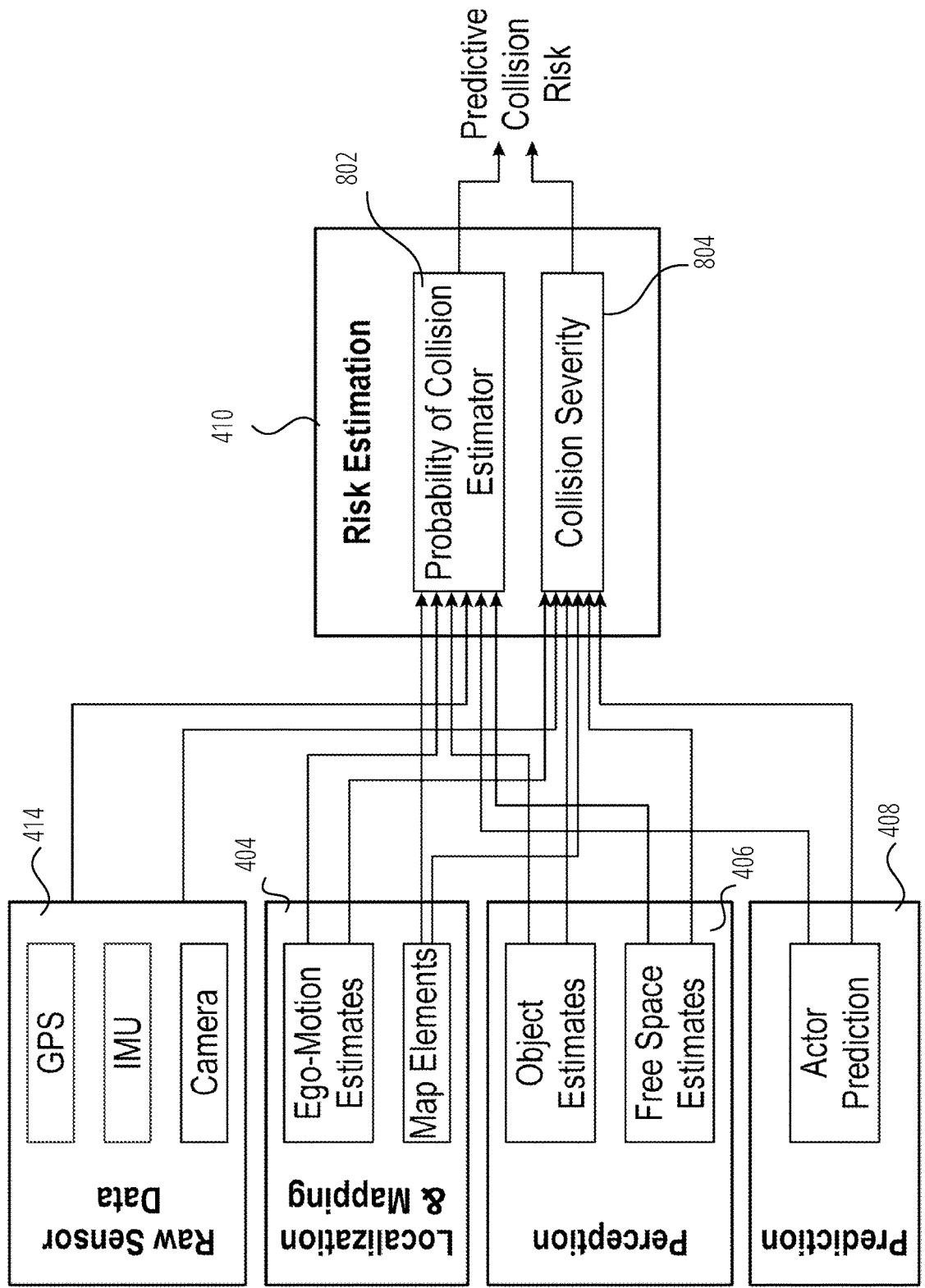
FIG. 8 is a diagrammatic representation of operations and components of the risk estimation component, according to some example

FIG. 8 is a diagrammatic representation of operations and components of the risk estimation component 410, according to some examples. The risk estimation component 410 is responsible for estimating the overall risk of an accident that may occur in the future, namely estimating the probability of potential collision along with the estimated severity of such a collision.

The risk estimation component 410 deals with the challenge of assigning probabilities to future outcomes of the world, particularly focusing on scenarios that carry a risk of harm or bodily injury to a user of the mobility safety system 104 or other traffic participants, as well as damage to property or goods. Risk estimation systems take as input raw sensor data 414, localization estimates from the localization and mapping component 404, perception outputs from the perception system 406, and prediction outputs (or any subset thereof) from the prediction component 408 in order to estimate the probability and risk of certain scenarios and events.

Example components of the risk estimation component 410 include:

Probability of Collision Estimator 802: This component analyzes various scenarios and estimates the probability of potential collision between actors in the world, including collisions between an actor and the ego-vehicle, e.g., the user of the mobility safety system 104.

Collision Severity component 804: For any two actors colliding, the relative velocities, object shapes, actor types, and more may be determined, including the potential severity of a collision.

The output of the risk estimation component 410 includes an overall estimate of risk, particularly focused on the user of the mobility safety system 104. The risk estimation component 410 predicts this risk over a time horizon into the future, allowing the mobility safety system 104 to predict the probabilities of accidents before they occur.

The risk estimation component 410 may use perception and prediction data as input, however some models can infer probabilistic risk results directly from raw sensor data 414, using multiple observations of a scene in order to directly predict the probability of a dangerous road scenario.

4.6. Alert Activation Component 412

A further component of the compute graph consists of software control of the alert activation component 412 described above. In such cases, various aspects of the system (e.g., the overall risk level) are used to determine whether alerts should be activated. For example, as a car approaches dangerously, the alerts may trigger when the mobility safety system 104 determines that there is a potential hazard to a user of the mobility safety system 104.

In some examples, the alert activation component 412 is responsible for determining whether alerts should be triggered based on the overall risk level of a situation within the traffic environment 102. This component takes input from the risk estimation component 410 and other components of the compute graph to determine whether an alert should be activated. The purpose of the alerts is to notify the user of the mobility safety system 104 of potential hazards in the environment, allowing them to take appropriate action to avoid accidents.

The alert activation component 412 may use various methods to determine when an alert should be triggered. For example, it may use a threshold-based approach where a predetermined risk level triggers an alert. Alternatively, it may use a probabilistic approach, where the probability of a potential collision is calculated, and an alert is triggered when the probability exceeds a certain threshold.

The type of alert triggered may depend on the severity of the risk. For example, a mild risk may trigger a first level of a visual or audio alert, while a more severe risk may trigger a second, higher level of alert, with greater visual or audible magnitude. In some examples, where the mobility safety system 104 has is coupled to the mobility platform control systems or wearable devices of an operator of the mobility platform, physical alerts may also be generated, such as braking or swerving the mobility safety system 104 to avoid a potential collision.

The alert activation component 412 may also take into account other factors, such as the user's preferences, the environmental conditions, and the traffic laws in the area.

The alert activation component 412 may also consider other factors, such as the user's preferences, the environmental conditions, and the traffic laws in the area. For example, the user may have specified a preference for a specific type of alert, or the traffic laws may prohibit certain types of alerts in certain situations.

4.5. Machine Learning Systems

For multiple components, including the localization and mapping component 404, the localization and mapping component 404, the perception system 406, the prediction component 408, the risk estimation component 410, and alert activation component 412, the mobility safety system 104 uses machine learning systems.

In some examples, a dataset consisting of the desired inputs and outputs of each component is used to train a model to predict outputs based upon a new, unseen input data for each of these components. In other words, in some examples, at least some of the multiple components include dedicated trained models, each of which may be subject to ongoing training as described below.

In some examples, a unified or partially unified trained model may be used across multiple of the components, as opposed to having dedicated trained models for each of the components. As such, the mobility safety system 104 manages the inputs and outputs of each component in the compute graph, such that, when paired with supervisory labels, or other supervision techniques, the onboard machine learning models are improved to handle new scenarios or to react to previous scenarios in an improved manner.

For example, in the case of training of a risk estimation component 410, sensor data, actor positions, and velocities, and future action motion may be used to label a correct risk value for each scenario, identifying road events within traffic environments 102 that carried higher risk from those with low risk, for use in training models.

Supervised Labels

Supervised labels may be used for training machine learning systems for the mobility safety system 104. In a supervised learning approach, components of the mobility safety system 104 are trained on a labeled dataset, where each input is associated with a desired output. These labeled datasets are created through the collection of real-world sensor data in various scenarios and environments.

For example, in the case of the localization and mapping component 404, the desired output is an accurate measurement of the ego-vehicle motion over time, which is used for accurate localization and mapping. The labeled dataset for the localization and mapping component 404 includes sensor data and corresponding accurate pose, position and orientation information for the ego-vehicle.

Similarly, for the perception system 406, the labeled dataset includes accurately identified object locations for each set of sensor readings. Training for the prediction component 408 uses a labeled dataset of future object locations over time. For training for the risk estimation component 410, the labeled dataset includes highlighting specific regions of time with risk of harm or bodily injury to a user of the mobility safety system 104 or other traffic participants or actors.

During the training processes, a machine learning system learns to generalize patterns in the labeled dataset, allowing it to predict the desired output for new, unseen input data. The model may be trained iteratively, updating the model's parameters to minimize the difference between its predictions and the true output values in the labeled dataset.

Temporal Association of Events

In order to handle time varying elements in the prediction component 408 or risk estimation component 410 of the mobility safety system 104, supervised labels may include information about future events. The supervised labels for the risk estimation component 410 can indicate the measured risk of the mobility safety system 104 at a given time, but predicting future risk requires considering the temporal association between events at a given time and the level of risk experienced at a future time. When used as part of the mobility safety system 104, the prediction component 408 predicts future risk, both in terms of magnitude as well as time horizon in which future risk may occur.

Some examples may handle temporal association of events by using time series analysis techniques. Time series analysis involves analyzing data collected over time, identifying patterns, trends, and changes in the data. In the context of the mobility safety system 104, time series analysis can be used to identify patterns in the sensor data over time, and to predict future risk based on these patterns.

In some examples, temporal association of events in the mobility safety system 104 can be addressed using various types of neural networks. Recurrent Neural Networks (RNNs) can be used to process sequential data, such as time series data, by retaining information from previous time steps to inform the current prediction. RNNs can be trained on a sequence of data to predict future events, making them a suitable solution for predicting the motion of actors in the traffic environment.

Another neural network architecture that can be utilized is the Convolutional Neural Network (CNN), which can be trained to recognize patterns in image data, for example. For example, a CNN can be trained to recognize pedestrians or vehicles in camera data. CNNs may be used in combination with other neural network architectures, such as RNNs, to process different types of sensor data and generate predictions.

In addition to RNNs and CNNs, Spatial Temporal Networks (STMs) can be used for predicting the future motion of actors in the traffic environment 102. STMs may handle both spatial and temporal information by using a 3D convolutional network to model the spatial and temporal relationships in the data. This architecture can be used to generate predictions of object trajectories and velocities over time.

Transformers are another neural network architecture that can be used for sequence modeling and prediction. Transformers use a self-attention mechanism to process sequential data, allowing the network to attend to different parts of the sequence and generate predictions. Transformers may be applied to the mobility safety system 104 to process sequential sensor data and generate predictions of future events.

To implement the risk estimation component 410, the mobility safety system 104 can use a supervised learning approach where sensor data is annotated with risk levels at each time step to generate labeled data. This labeled data can be used to train a time series model or an RNN to predict future risk levels based on past sensor data. The input data may be preprocessed to extract features that are relevant to the risk estimation task, such as the velocity and orientation of objects in the scene, distances between objects, and their relative motion.

Convolutional neural networks (CNNs) may be used to extract features from raw sensor data, such as images or lidar point clouds. CNNs may use filters to learn features such as edges, corners, and shapes, and can be trained to identify objects and their attributes, such as size and position. The output of a CNN can be fed into an RNN to capture the temporal dependencies between frames of data and predict future risk levels.

Spatial-temporal models (STMs) can also be used to capture both spatial and temporal dependencies in sensor data. STMs may use 3D convolutions to learn spatial features from volumetric data, such as a sequence of lidar point clouds, and use RNNs to capture temporal dependencies between frames. STMs can be trained end-to-end to predict future risk levels from raw sensor data.

Transformers are another type of neural network that can capture temporal dependencies in sequential data. Transformers use attention mechanisms to focus on different parts of the input sequence and can be trained on large amounts of data to predict future risk levels. Transformers have been shown to be effective in natural language processing tasks, but can also be applied to sequential sensor data.

By considering the temporal association of events, the mobility safety system 104 can provide accurate and reliable risk estimations, leading to better safety outcomes for users of the system. The trained model can be used in real-time to estimate the risk of potential collisions and activate alerts if necessary to avoid accidents.

Training ML Systems Based Upon Future Risk

For training of the machine learning systems for use with the mobility safety system 104, temporal association may be used to identify times at which risk increases in the future, thus helping the machine learning systems identify scenarios where current events predict the future high risk states.

Unsupervised and Semi-Supervised Learning

Unsupervised and semi-supervised learning are techniques that, in some examples, can be employed to train the machine learning systems of the mobility safety system 104. In contrast to supervised learning, which relies on labeled datasets, unsupervised learning can be used to identify patterns and structures in unlabeled data. For example, clustering algorithms can be used to group sensor data into similar clusters based on the data's similarity. These clusters can then be used as the basis for training machine learning models.

Semi-supervised learning is also an approach that can be used to train machine learning models on a relatively smaller amount of labeled data is available. This method combines both labeled and unlabeled data to improve the accuracy of the machine learning models. In the context of the mobility safety system 104, this involves using some labeled data, such as data generated during supervised training, along with large amounts of unlabeled data collected during normal operation of multiple mobility safety systems 104 and other sensors with traffic environments 102.

By using unsupervised and semi-supervised learning, it is possible to expand the amount of data it uses to train its machine learning systems, resulting in more robust and accurate predictions. This additional data can be used to refine the localization and mapping component 404 a perception system 406, a prediction component 408, and a risk estimation component 410, improving performance and ensuring the safety of users of the mobility safety system 104.

Unified Model

The mobility safety system 104 is composed of several individual machine learning systems, each with a specific input and output, such as the localization and mapping component 404, the perception system 406, the prediction component 408, and the risk estimation component 410. In some examples, at least some of these individual trained models may be combined to produce unified models with fewer intermediary steps, which can reduce computation and model sizes while maintaining equivalent output quality.

To create a unified model, individual sequential models are replaced by a single, larger model that encompasses the inputs and outputs of the sum total sequential system.

Using a unified model may require additional training data to cover the expanded input-output space. This additional training data can be obtained using semi-supervised or unsupervised learning techniques described above, which can produce large datasets of example events to learn from. These techniques can also help improve the overall accuracy and robustness of the unified model.

AI Accelerator Chip 212

When performing machine learning inference on the mobility safety system 104, ML systems may use the AI accelerator chip 212 previously described herein to perform fast calculations as part of the compute graph of the application layer.

4.5. Software Infrastructure

As a basis for the application layer of the mobility safety system 104, the mobility safety system 104 includes an operating system (e.g., operating system 1202), including device drivers (e.g., drivers 1204) for sensors (e.g., sensors 202) as well as the audio and visual alert mechanisms 214. In addition, interfaces are provided to send sensor data and other derived quantities to the onboard data storage (e.g., memory 1206).

The software infrastructure supports additional modalities for which the mobility safety system 104 is useful. For example, by recording video directly to the data storage on the embedded computer of the mobility safety system 104, the mobility safety system 104 provides functionality focused on capturing road events of interest to a bicyclist.

5. User Interactions

A user can interact with the mobility safety system 104 in a variety of ways.

5.1. Mounting the Mobility Safety System 104

Bracketry may be used to locate the mobility safety system 104 at a point on a bicycle where it can see the roadway in a chosen direction from the bicycle. A quick release feature allows the mobility safety system 104 to be easily removed from the mounting bracket for battery charging and other purposes.

5.2. Enabling and Disabling the Mobility Safety System 104

The mobility safety system 104 may be powered on via a single button, pressed by the user to turn the mobility safety system 104 on and off. When stationary, the mobility safety system 104 can use its sensors 202 to determine its nearby environment, entering a power-saving mode when sensor processing is not required.

Furthermore, the user is able to set specific geolocations as privacy locations, for example a home or office. When at these locations, the mobility safety system 104 disables camera functionality, in order to preserve privacy as desired by a user. In addition, simple obscurants such as a lens cap can be used.

When detected to be in motion or in an appropriate environment, such as on a street, the mobility safety system 104 begins monitoring its surroundings for hazards, thus enabling the various features of its software architecture.

5.3. Alerts and Warnings

When a potential hazard is detected, the mobility safety system 104 provides alerts in various ways. For hazards that are mere inconveniences or rare possibilities, the mobility safety system 104 changes the blinking pattern of its lights and emits a loud warning noise via an onboard speaker. This noise warns the user of the mobility safety system 104, as well as any nearby traffic participants, of the potential hazard.

For hazards that require immediate attention, for example a threat of a collision within the next few seconds, the mobility safety system 104 enables a much louder alarm, thus ensuring the alert is received by occupants of nearby vehicles with closed doors and windows.

5.4. Interaction Via External Device

A user can use an external device, such as a smartphone or computer, with or as part of the mobility safety system 104 through either wireless communication (such as Bluetooth or ANT+) or via the USB-C port located on the mobility safety system 104.

When used in this manner, the resulting output data from an autonomy system of the mobility safety system 104 may be transmitted to the external device. Example usages include:

- A device displaying real-time images and raw sensor data 414 for a user to view.
- A device displaying computer-generated visualizations of nearby objects and hazards, for the user to view.
- An external method of providing alarms to the user, visually showing the user the source of a hazard through the generated display.

Figure 9:
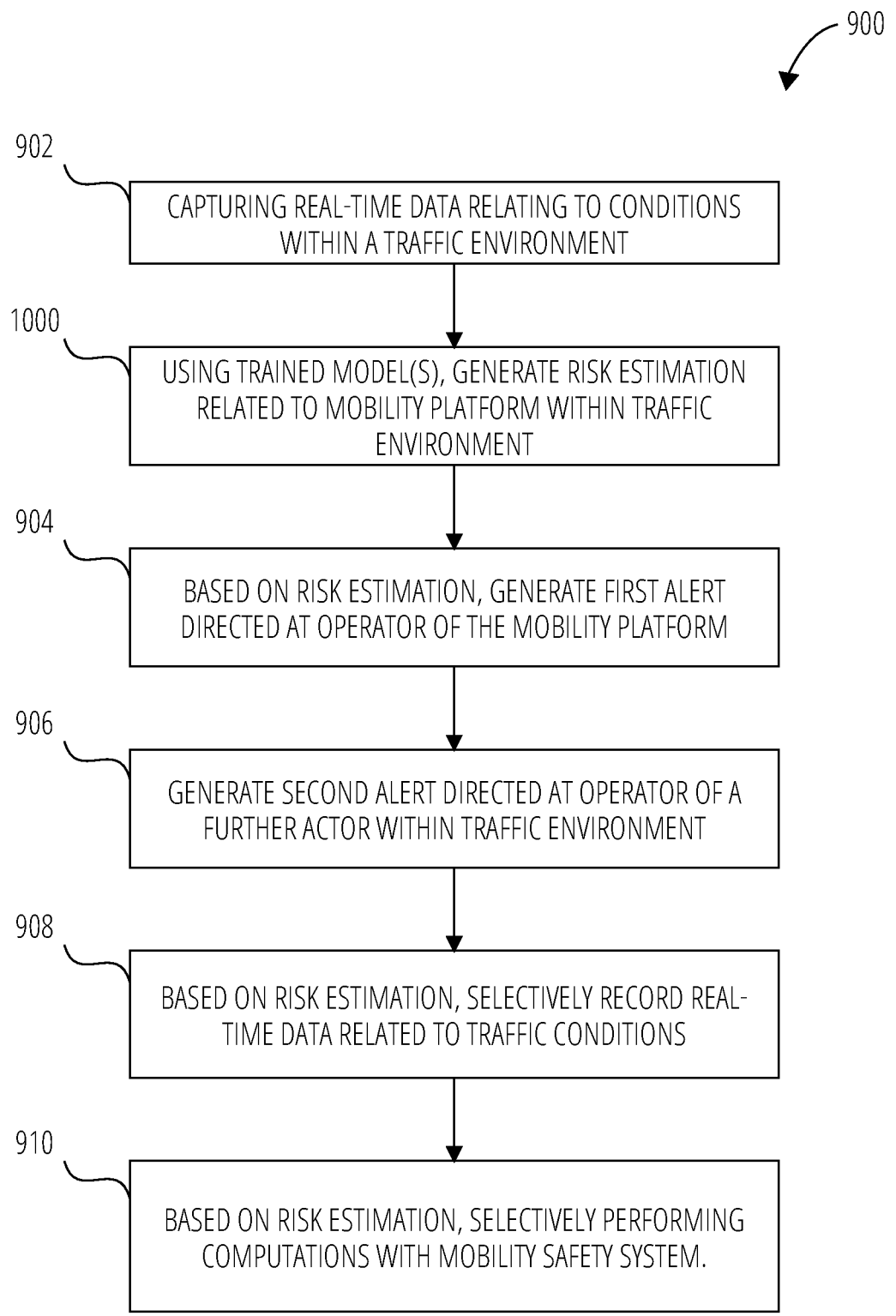
FIG. 9 is a flowchart illustrating a method, according to some examples, of operating to a mobility safety system to provide alerts to actors within a traffic environment.

FIG. 9 is a flowchart illustrating a method 900, according to some examples, of operating to a mobility safety system 104 to provide alerts to actors within a traffic environment 102.

At block 902, the mobility safety system 104 captures real-time data from its sensors 202 (e.g., IMU, camera) relating to conditions within a traffic environment 102. The sensor data is fed into the onboard compute modules 218, which consists of an embedded computer 210 and an AI accelerator chip 212.

At block 1000, the mobility safety system 104 uses at least one trained model to generate a risk estimation related to a mobility platform within the traffic environment 102. This may include using machine learning systems for various components of the mobility safety system 104, including the localization and mapping component 404, the perception system 406, the prediction component 408, and the risk estimation component 410. The trained models may be developed based on supervised, semi-supervised or unsupervised learning methods, and take into account the temporal association of events. Further details regarding example operations that may be performed at block 1000 are described below with reference to FIG. 10.

In block 904, the mobility safety system 104 generates a first alert based on the risk estimation to notify the operator of the mobility platform of any potential hazards or risky situations. This alert may be in the form of an audible or visual signal, such as an alarm sound or flashing lights on the mobility platform. The alert may also include haptic feedback, such as vibrations or force feedback, to provide the operator with a physical warning.

The generation of the first alert is performed by the alert mechanisms 214 of the mobility safety system 104, which receives input from the risk estimation component 410. The risk estimation component 410 uses machine learning techniques to estimate the level of risk based on real-time data captured from the sensors 202. Once the level of risk exceeds a certain threshold, for example, the alert mechanism 214 is triggered to generate the first alert directed at the operator of the mobility platform.

In block 906, the mobility safety system 104 generates a second alert directed at an operator of a further actor within the traffic environment 102. This alert may be used to notify nearby vehicles, pedestrians, or other traffic actors of the presence and position of the mobility platform, and to warn them of any potential hazards. The alert may also be used to signal to other traffic actors the intended movements of the mobility platform, such as when turning the mobility platform or changing lanes.

The generation of the second alert or alerts is performed by the alert mechanisms 214 of the mobility safety system 104. These alerts may be visual and/or audible alerts, as detailed above.

The alert mechanisms 214 may also enable mobility safety systems 104 to communicate with other devices in the traffic environment 102, such as nearby vehicles or pedestrians, using onboard wireless communication via Wi-Fi, Bluetooth, or LoRa. The alert mechanisms 214 receive input from the risk estimation component 410, which estimates the level of risk and identifies any potential hazards in the traffic environment. Based on this information, the alert mechanism 214 generates the second alert(s) to warn other traffic actors of the presence and position of the mobility platform and to promote safe interaction between the mobility platform and other actors in the traffic environment 102.

At block 908, the mobility safety system 104 selectively records real-time data related to traffic conditions in the traffic environment 102 based on the risk estimation generated in block 1000. The mobility safety system 104 may use one or more data storage components such as hard disk drives, solid-state drives, or flash memory cards to store the recorded data. These data storage components may be connected to the embedded computer 210 via input/output interfaces such as Universal Serial Bus (USB), Ethernet, or General Purpose Input/Output (GPIO) pins.

The recorded data may include sensor data collected by the sensors 202, as well as any other data relevant to the traffic environment 102, such as weather conditions or traffic patterns. The data may be recorded in a compressed or uncompressed format, depending on the available storage capacity and processing capabilities of the mobility safety system 104.

Selective recording allows the mobility safety system 104 to conserve storage space and processing resources by recording only the data that is most relevant to the risk estimation generated in block 1000. For example, if the risk estimation indicates a high probability of a collision with a pedestrian, the mobility safety system 104 may selectively record only the sensor data related to the pedestrian's location and movement, rather than recording all sensor data collected by the mobility safety system 104.

The recorded data may be used for offline analysis, such as training machine learning models or identifying areas for improvement in the mobility safety system 104. Additionally, the data may be used for forensic analysis in the event of an accident or incident involving the mobility safety system 104.

Selective recording of real-time data related to traffic conditions allows the mobility safety system 104 to optimize its use of storage and processing resources while still capturing the most relevant data for improving safety in the traffic environment 102.

At block 910, the mobility safety system 104 selectively performs computations based on the risk estimation generated in block 1000. These computations may include a wide range of actions to help mitigate the risk and ensure the safety of the operator of the mobility platform, as well as other actors within the traffic environment 102.

In some examples, based on the risk estimation produced by the risk estimation component 410, the mobility safety system 104 can selectively perform computations by activating or deactivating specific components. For example, if the risk estimation indicates a high likelihood of collision, the mobility safety system 104 can activate the alert activation component 412 to generate a warning for the operator of the mobility platform or other actors in the traffic environment.

Similarly, if the risk estimation indicates that the mobility platform needs to adjust its behavior, such as reducing speed or adjusting course, the mobility safety system 104 can selectively activate the appropriate component or components to achieve the desired behavior. For instance, the prediction component 408 can be activated to estimate the future motion of the mobility device and other traffic participants, and the localization and mapping component 404 can be activated to update the map and location of the mobility platform in real-time. Based on this information, the mobility safety system 104 can then selectively activate the appropriate actuators (not shown in FIG. 4) to adjust the behavior of the mobility platform accordingly.

Another computation that may be performed is generating further alerts to be directed at the operator of the mobility platform or other actors within the traffic environment 102. For example, if the risk estimation indicates that a pedestrian is crossing the path of the mobility platform, the mobility safety system 104 may generate an additional alert to warn the operator to take evasive action. These alerts may be generated via onboard audio or visual displays, or through external communication channels such as Wi-Fi, Bluetooth, or LoRa.

In addition to adjusting the behavior of the mobility platform and generating alerts, the mobility safety system 104 may provide feedback to the operator of the device via a user interface for example on a mobile device or bike computer. For example, the user interface may display information about the current risk level within the traffic environment 102, as well as suggestions for actions to take to reduce that risk. This feedback may assist in ensuring that the operator of the mobility device is aware of potential hazards and can take appropriate actions to avoid them.

These computations may be selectively performed based on the risk estimation generated in block 1000, which takes into account the real-time data captured by the sensors 202 and processed by the various machine learning systems onboard the mobility safety system 104. The result is a highly responsive and adaptive system that can help ensure the safety of the operator of the mobility platform as well as other actors within the traffic environment 102. By selectively activating and deactivating specific components based on the risk estimation, the mobility safety system 104 can optimize its computational resources, reduce latency, and minimize power consumption. This contributes to the efficiency of the mobility safety system 104 while avoiding compromising the safety of the mobility device and its operator, as well as other actors in the traffic environment.

Overall, the flowchart of FIG. 9 describes the operation of the mobility safety system 104 in real-time, using a combination of sensor data, machine learning models, and alert mechanisms to keep operators of mobility platforms safe while navigating traffic environments.

Figure 10:
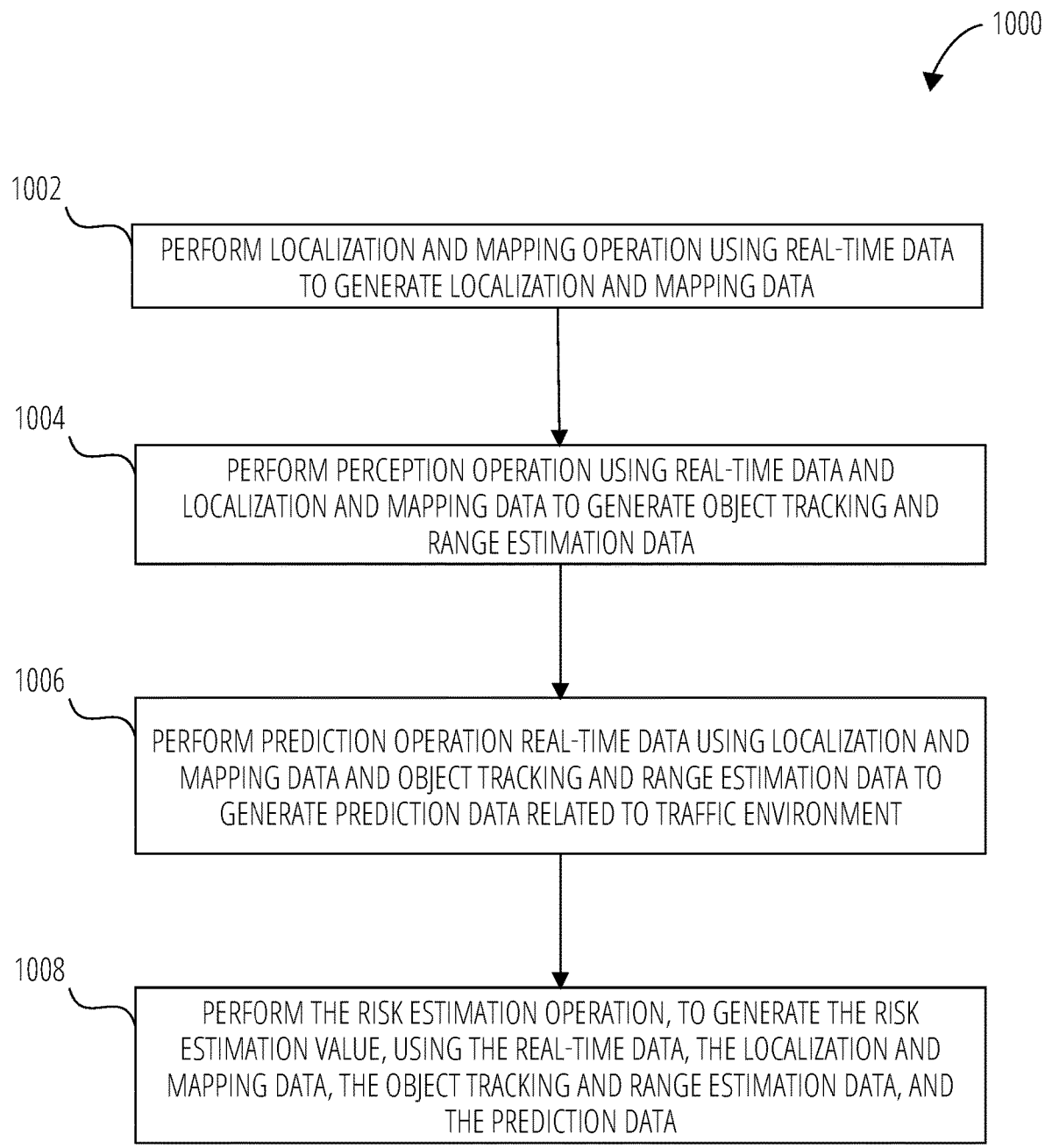
FIG. 10 is a flowchart illustrating the operations that may be performed by the mobility safety system in order to generate a risk estimate, according to some examples.

FIG. 10 is a flowchart illustrating for the operations that may be performed at block 1000 by the mobility safety system 104 in order to generate a risk estimate, according to some examples.

In block 1002, the localization and mapping component 404 performs a localization and mapping operation using the real-time data to generate localization and mapping data. In some examples, the localization and mapping component 404 of the mobility safety system 104 operates to estimate the position and orientation of the mobility platform within the traffic environment 102, and generating a data picture the traffic environment 102 to identify nearby objects in this traffic environment 102. The localization and mapping component 404 continuously refines the estimates of the ego-motion of the user, using raw sensor data 414, such as GPS data 502 from the GPS 208 and IMU data 504 from the IMU 206, which provide real-time readings on how the mobility safety system 104 is moving over time, as measured by accelerometers and gyroscopes.

The localization and mapping component 404 may use an iterative estimation method, such as a Kalman Filter, to provide real-time estimates of the position and orientation of the mobility safety system 104, as well as derivatives of these quantities, including velocity, angular rates, and linear and angular accelerations. In cases where the mobility safety system 104 is rigidly attached to a mobility platform (e.g., bicycle, scooter, or similar), a motion model of the mobility platform is further used as input to the pose estimation system 506 through the Mobility platform model component 508.

In addition to the sensors and the pose estimation system, the localization and mapping component 404 also uses odometry based on exteroceptive sensors (e.g., cameras 204) through the Visual Odometry components 510 as input to the pose estimation system 506.

The environmental map 512 is continuously updated with data about the surrounding environment, such as ground surface geometry, road markings, and curb/sidewalk locations, to improve localization capabilities. An existing map can be used to refine the localization and mapping component 404, while localized positions can be used to refine the environmental map 512.

At block 1004, the mobility safety system 104 performs a perception operation using the real-time data and the localization and mapping data generated in block 1000 to generate object tracking and range estimation data. The perception system 406 takes raw sensor data 414 from various sensors 202, such as cameras 204, along with localization and map data, to estimate the motion of nearby objects and road users, as well as to estimate the nearby traffic environment 102.

The perception system 406 performs several tasks, including object detection 602, orientation estimation 604, object tracking 606, ground surface estimation 608, and range estimation 610. Object detection involves identifying vehicles and other objects in the traffic environment 102, using camera data to estimate the position, orientation, and geometry of objects within a field of view of the camera 204.

Once an actor is detected, the estimate of the orientation is further refined through a comparison of object detections against the mobility safety system's IMU 206 and GPS 208.

Object tracking involves performing detection and estimation of an actor's position and orientation across multiple frames of input sensor data, which allows the perception system 406 to track actors in a traffic environment 102 over time, further estimating quantities such as object motion and instantaneous velocity.

Ground surface estimation involves analyzing the streetscape and scene of a traffic environment 102 surrounding the mobility safety system 104, using the raw sensor data 414 and stored environmental map 512, to provide estimates of the geometry of a road 106, identifying curbs, road paint, street signs, and more, in real-time or near real-time.

Range estimation involves using the ground surface results and further raw sensor data 414 to estimate distances to actors and/or objects in a traffic environment 102, identifying potential obstacles and also noting free space.

The output of the perception system 406 is object estimate data 612 that includes an estimate of objects in the traffic environment 102 (including, for example, position, orientation, and short-term motion) as well as an estimate of free space in the traffic environment 102. By using the data generated by the perception system 406, the mobility safety system 104 can perform more accurate and effective computations in order to provide safer travel for the user.

At block 1006, the prediction component 408 performs a prediction operation real-time data using the localization and mapping data and the object tracking and range estimation data to generate prediction data related to the traffic environment. In some examples, the prediction component 408 of the mobility safety system 104 uses data from the localization and mapping component 404 and the object tracking and range estimation data generated by the perception system 406 to forecast future motion of relevant actors in the traffic environment 102. The prediction component 408 may use a combination of machine learning and probabilistic modeling to generate multiple possible future trajectories for other actors in the scene.

The actor motion prediction component 702 of the prediction component 408 uses perception object estimates, sensor data, and map elements to predict how actors will move over time, through the world. This is achieved through machine learning algorithms such as recurrent neural networks (RNNs) or long short-term memory (LSTM) networks. These networks are trained on large amounts of data to learn patterns of motion and behavior of different types of actors in different traffic scenarios. Once trained, the networks can predict future motion based on current and past observations of the actor's behavior and the environment around them.

The actor-ego interaction prediction component 704 of the prediction component 408 analyzes how actors interact with each other and with the mobility safety system 104, such as slowing down, speeding up, or changing direction to avoid collisions. The actor-ego interaction prediction component 704 also uses machine learning algorithms to predict likely outcomes of these interactions. For example, if the mobility safety system 104 is approaching a pedestrian who is looking at their phone and not paying attention to the road, the actor-ego interaction prediction component 704 may predict that the pedestrian is likely to continue walking in their current path and that the mobility safety system 104 needs to take evasive action.

The actor-map interaction prediction component 706 of the prediction component 408 predicts how actors move relative to fixed infrastructure, such as following lanes or obeying traffic rules. The actor-map interaction prediction component 706 uses map data from the localization and mapping component 404 to make predictions about how actors will interact with the traffic environment 102 around them. For example, if the mobility safety system 104 is approaching a roundabout, the actor-map interaction prediction component 706 may predict that a car entering the roundabout from the right is likely to continue moving in a clockwise direction and that the mobility safety system 104 should wait for a safe opportunity to enter the roundabout.

The output of the prediction component 408 consists of multiple possible future outcomes and scenarios for actors in the scene, each with a corresponding probability of occurrence. These safety-relevant scenarios are used by the risk estimation component 410 to estimate the likelihood of a collision or other safety incident. The prediction component 408 continuously updates its predictions based on new sensor data and adjusts the probabilities of outcomes as more information becomes available. The prediction data is then used by the risk estimation component 410.

At block 1008, the risk estimation component 410 performs the risk estimation operation, to generate the risk estimation value, using the real-time data, the localization and mapping data, the object tracking and range estimation data, and the prediction data.

In some examples, the risk estimation operation performed by the risk estimation component 410 at block 1008 takes the output from the previous localization and mapping, perception, and prediction operations, as well as the raw sensor data, to estimate the probability and severity of a potential collision or dangerous scenario in the future. The risk estimation component 410 is responsible for estimating the overall risk of an accident that may occur in the future, including estimating the probability of potential collision and the estimated severity of such a collision.

The probability of collision estimator 802 analyzes various scenarios and estimates the probability of potential collision between actors in the world, including collisions. The probability of collision estimator 802 considers the position, velocity, and orientation of nearby objects, as well as the motion of the mobility safety system 104, to estimate the probability of collision. The collision severity component 804 then takes the estimated collision probability and determines the potential severity of the collision based on factors such as relative velocities, object shapes, and actor types.

The risk estimation component 410 predicts the overall risk over a time horizon into the future, allowing the mobility safety system 104 to predict the probabilities of accidents before they occur. This may be achieved through probabilistic modeling of potential future outcomes, including the possibility of dangerous scenarios such as a collision with a pedestrian or another vehicle. The risk estimation component 410 outputs an estimate of the overall risk, which is used by the mobility safety system 104 to inform its decision-making and control actions. The risk estimation component 410 may use perception and prediction data as input, however, some models can infer probabilistic risk results directly from raw sensor data 414, using multiple observations of a scene in order to directly predict the probability of a dangerous road scenario.

6. Scenarios

Figure 11:
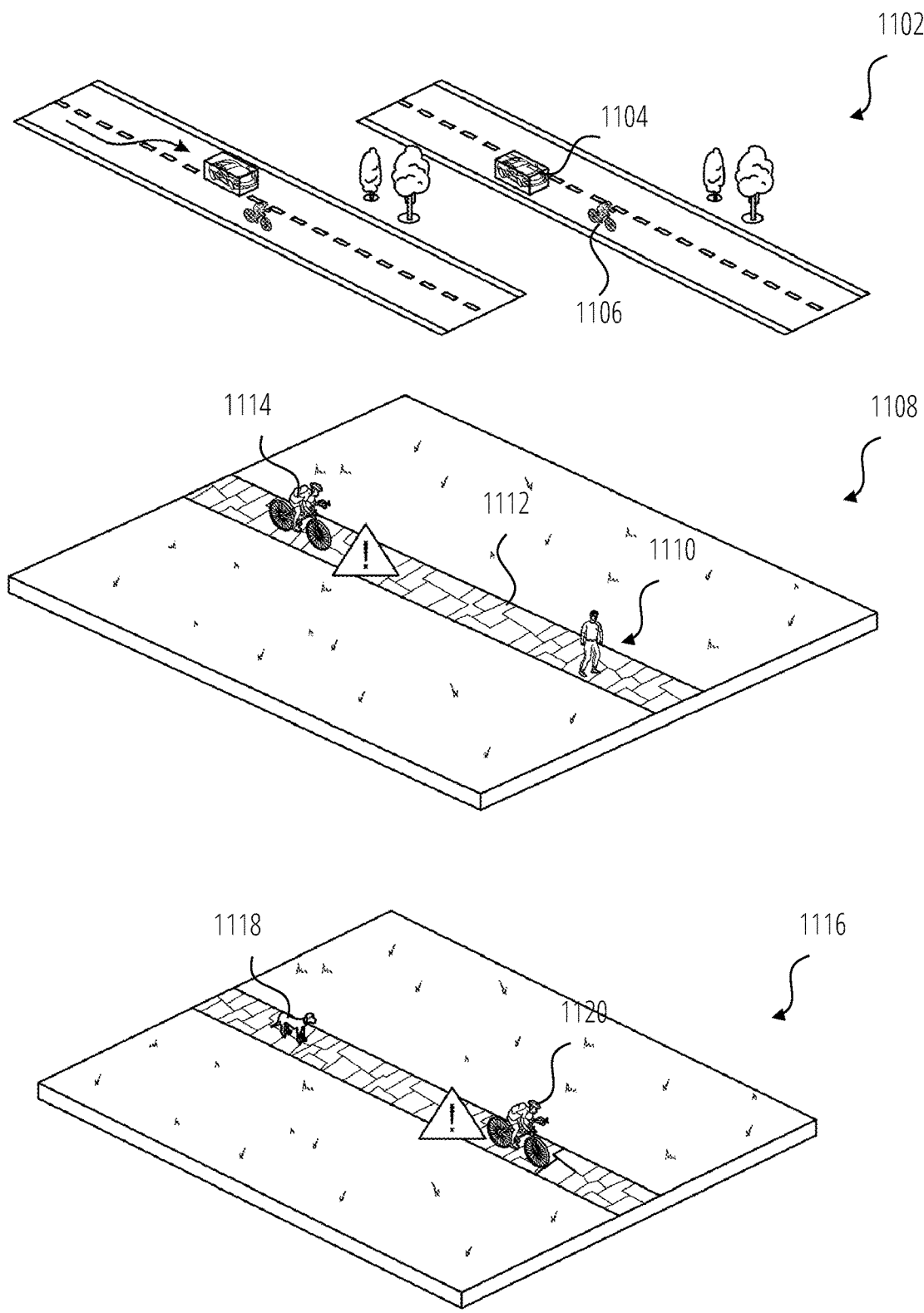
FIG. 11 illustrates an aspect of the subject matter, according to some examples.

FIG. 11 illustrates scenarios of how the mobility safety system 104 may operate, to add a layer of safety for traffic actors, according to some examples.

6.1. Approaching Vehicle from Behind

In a first scenario 1102, the mobility safety system 104 uses its risk estimation component 410 to differentiate between scenarios, for example when an approaching vehicle 1104 safely navigates around a bicyclist 1106 (left), vs. when a vehicle 1104 approaches in an unsafe manner (right). In the latter scenario, the mobility safety system 104 sends warnings to capture the attention of both the driver of the vehicle 1104 and the bicyclist 1106.

More specifically, in the first scenario 1102, consider a fast-moving vehicle 1104 approaches a bicyclist 1106, carrying a mobility safety system 104, from behind. In this scenario, the autonomy system of the mobility safety system 104 detects the fast-moving vehicle 1104 and tracks it over time as it approaches the bicyclist 1106. The prediction component 408 enumerates future possible scenarios, including: the approaching vehicle 1104 will slow to accommodate the bicyclist 1106; the vehicle 1104 will nudge left or change lanes to safely pass the bicyclist 1106; and finally, the approaching vehicle 1104 does not adjust its course and continues to proceed at speed toward the bicyclist 1106.

When continuously estimating the overall risk of collision for the user, the mobility safety system 104 assigns estimated probabilities to each of these scenarios. When the probability of the most dangerous scenarios reaches a critical threshold, warnings and alerts are emitted by the alert mechanisms 214 of the mobility safety system 104.

6.2. Bicyclist Warning to Pedestrians

In a second scenario 1108, the autonomy system of the mobility safety system 104 automatically detects pedestrians 1110 on a shared use path 1112. By automatically emitting warnings, to alert the pedestrian 1110 to the approaching bicyclist 1114, the mobility safety system 104 provides a fully autonomous replacement to the common bike bell.

More specifically, in the second scenario 1108, consider the bicyclist 1114 overtaking a pedestrian 1110, both on a shared-use path 1112. In this scenario, the mobility safety system 104 is mounted with sensors 202 pointing forward, in the direction of travel. In scenarios like this, bicyclists 914 often use bike bells or call out advance warnings such as "on your left" when passing.

The integration of the mobility safety system 104 adds autonomous operation to this warning system, using the application software to identify a pedestrian 1110 in advance, determine the risk of a potential collision, and sounding chimes and alarms to provide situational awareness to both the pedestrian and the bicyclist, and ensuring neither party is surprised by the others' actions.

6.3. Bicyclist Pursued by Canine

In a third scenario 1116, the mobility safety system 104 is also capable of detecting non-human actors in a scene, for instance detecting, tracking, and estimating risk due to a canine or dog 1118 that gives chase to a passing bicyclist 1120. By using the same alert mechanisms 214 for other vehicles, the mobility safety system 104 can emit warnings to discourage the dog 1118 from continuing to chase the bicyclist 1120.

More specifically, a common danger to bicyclists 1106 is being chased by dogs 1118, oftentimes where a dog 1118 might believe it is guarding its territory, despite the bicyclist 1106 traveling on shared roads or paths. In this scenario, the algorithms of the mobility safety system 104 are capable of detecting an animal giving chase to a bicyclist 1120. By tracking and monitoring the relative positions and velocities of all actors, the mobility safety system 104 can determine overall risk, and attempt to dissuade the animal by using alert mechanisms, using the same alarm alert mechanism 214 as for vehicles, but also providing warnings at ultrasonic frequencies heard by dogs but not by the human ear.

6.3. Automated Obscurant Detection

A camera lens (or other viewport of an exteroceptive sensor) can become obscured, typically through dirt, debris, and moisture from the environment. As such, the software algorithms of the mobility safety system 104 can be used to determine when the sensor (e.g., the camera 204) does not have an unobstructed view. In such a case, the mobility safety system 104 can alert the user, thus allowing a manual inspection of the lens and intervention to clean off any obscurants.

6.4. Lane Deviation Warning

In some examples, the mobility safety system 104 can provide a lane deviation warning to the user. The perception system 406 is responsible for analyzing raw sensor data 414 and determining the position of the mobility safety system 104 with respect to lane markings. In the event that the mobility safety system 104 deviates from its lane, the perception system 406 will trigger a warning message that is sent to the user through the alert mechanisms 214. The warning message may be a visual or audible alert, depending on the user's preferences.

The localization and mapping component 404 provides critical input for the lane deviation warning system. It provides an accurate estimate of the user's position and orientation with respect to the road, allowing the perception system 406 to accurately determine the position of the mobility safety system 104 relative to the lane markings.

6.5. Intersection Collision Avoidance

In some examples, the mobility safety system 104 can provide collision avoidance at an intersection. The perception system 406 is responsible for detecting other vehicles approaching the intersection and estimating their trajectory. The prediction component 408 can then generate multiple possible future scenarios, including those where the other vehicles may not be able to stop in time to avoid a collision.

If the mobility safety system 104 detects a potential collision, it will trigger the alert mechanisms 214 to warn the user of the danger. The alert message may be a visual or audible alert, depending on the user's preferences.

The localization and mapping component 404 provides critical input for the intersection collision avoidance system. It provides an accurate estimate of the user's position and orientation with respect to the intersection, allowing the perception system 406 to accurately detect other vehicles and estimate their trajectory.

6.6. Emergency Stop

In some examples, the mobility safety system 104 can provide an emergency stop capability in the event of an imminent collision. The prediction component 408 continuously monitors raw sensor data 414 and estimates the probability of a collision. If the probability of a collision reaches a critical threshold, the mobility safety system 104 will trigger an emergency stop mechanism.

The emergency stop mechanism can be implemented in several ways, depending on the specific mobility platform. For example, a bicycle may have a brake system that is automatically engaged when the emergency stop mechanism is triggered. A scooter or motorbike may have a similar brake system, or may be designed to slow down or stop more gradually to avoid loss of control.

The localization and mapping component 404 provides critical input for the emergency stop system. It provides an accurate estimate of the user's position and orientation, allowing the prediction component 408 to accurately estimate the probability of a collision.

Figure 12:
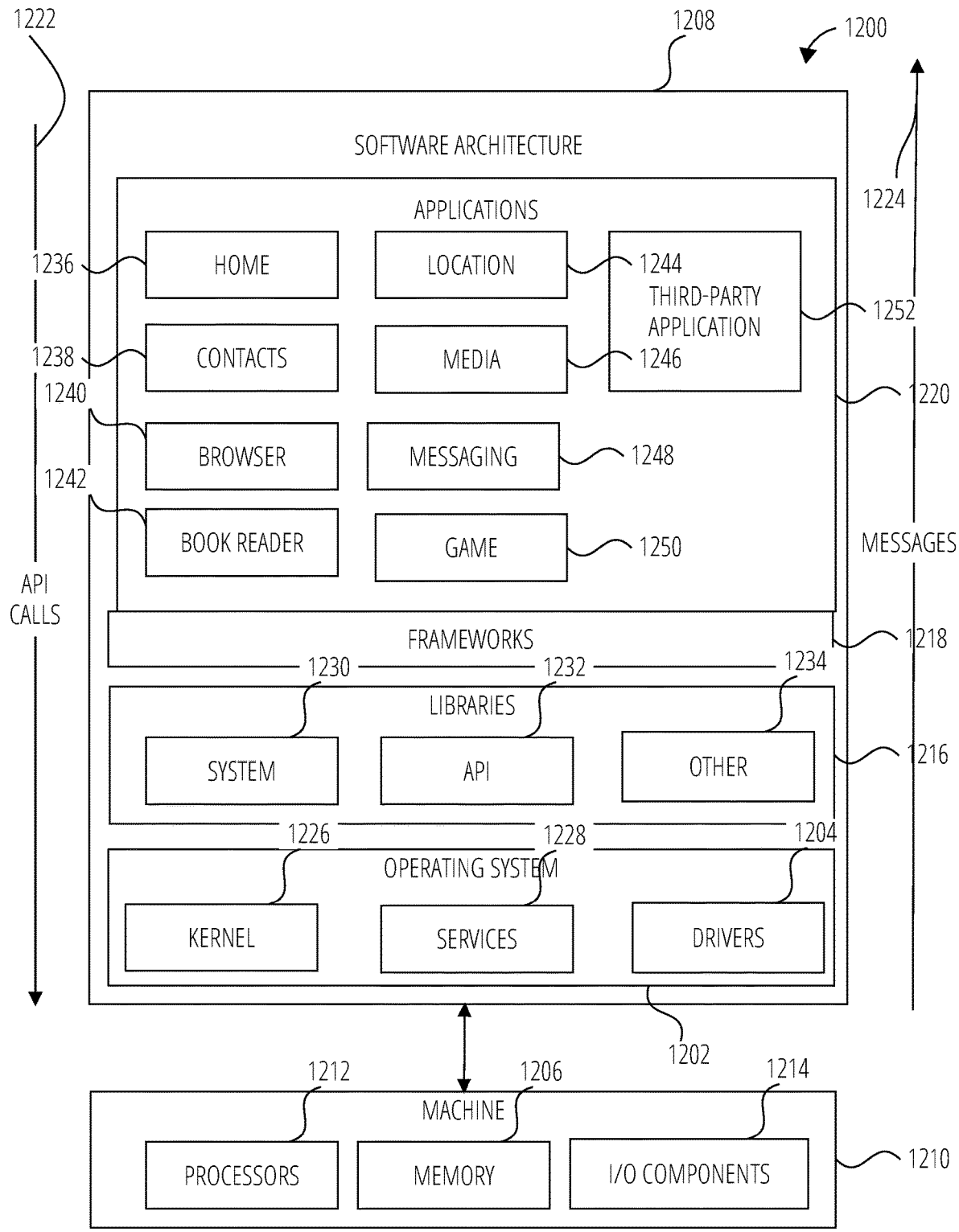
FIG. 12 is a block diagram showing a software architecture within which the present disclosure may be implemented, according to some examples.

FIG. 12 is a block diagram 1200 illustrating a software architecture 1208, which can be installed on any one or more of the devices (e.g., the safety system) described herein. The software architecture 1208 is supported by hardware such as a machine 1210 that includes processors 1212, memory 1206, and I/O components 1214. In this example, the software architecture 1208 can be conceptualized as a stack of layers, where each layer provides a particular functionality. The software architecture 1208 includes layers such as an operating system 1202, libraries 1216, frameworks 1218, and applications 1220. Operationally, the applications 1220 invoke API calls 1222 through the software stack and receive messages 1224 in response to the API calls 1222.

The operating system 1202 manages hardware resources and provides common services. The operating system 1202 includes, for example, a kernel 1226, services 1228, and drivers 1204. The kernel 1226 acts as an abstraction layer between the hardware and the other software layers. For example, the kernel 1226 provides memory management, Processor management (e.g., scheduling), component management, networking, and security settings, among other functionalities. The services 1228 can provide other common services for the other software layers. The drivers 1204 are responsible for controlling or interfacing with the underlying hardware. For instance, the drivers 1204 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 1216 provide a low-level common infrastructure used by the applications 1220. The libraries 1216 can include system libraries 1230 (e.g., C standard library) that provide functions such as memory allocation functions, string manipulation functions, mathematic functions, and the like. In addition, the libraries 1216 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 1216 can also include a wide variety of other libraries 1234 to provide many other APIs to the applications 1220.

The frameworks 1218 provide a high-level common infrastructure used by the applications 1220. For example, the frameworks 1218 provide various graphical user interface (GUI) functions, high-level resource management, and high-level location services. The frameworks 1218 can provide a broad spectrum of other APIs that can be used by the applications 1220, some of which may be specific to a particular operating system or platform.

In some examples, the applications 1220 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1220 are programs that execute functions defined in the programs. Various programming languages can be employed to create one or more of the applications 1220, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1222 provided by the operating system 1202 to facilitate functionality described herein.

Figure 13:
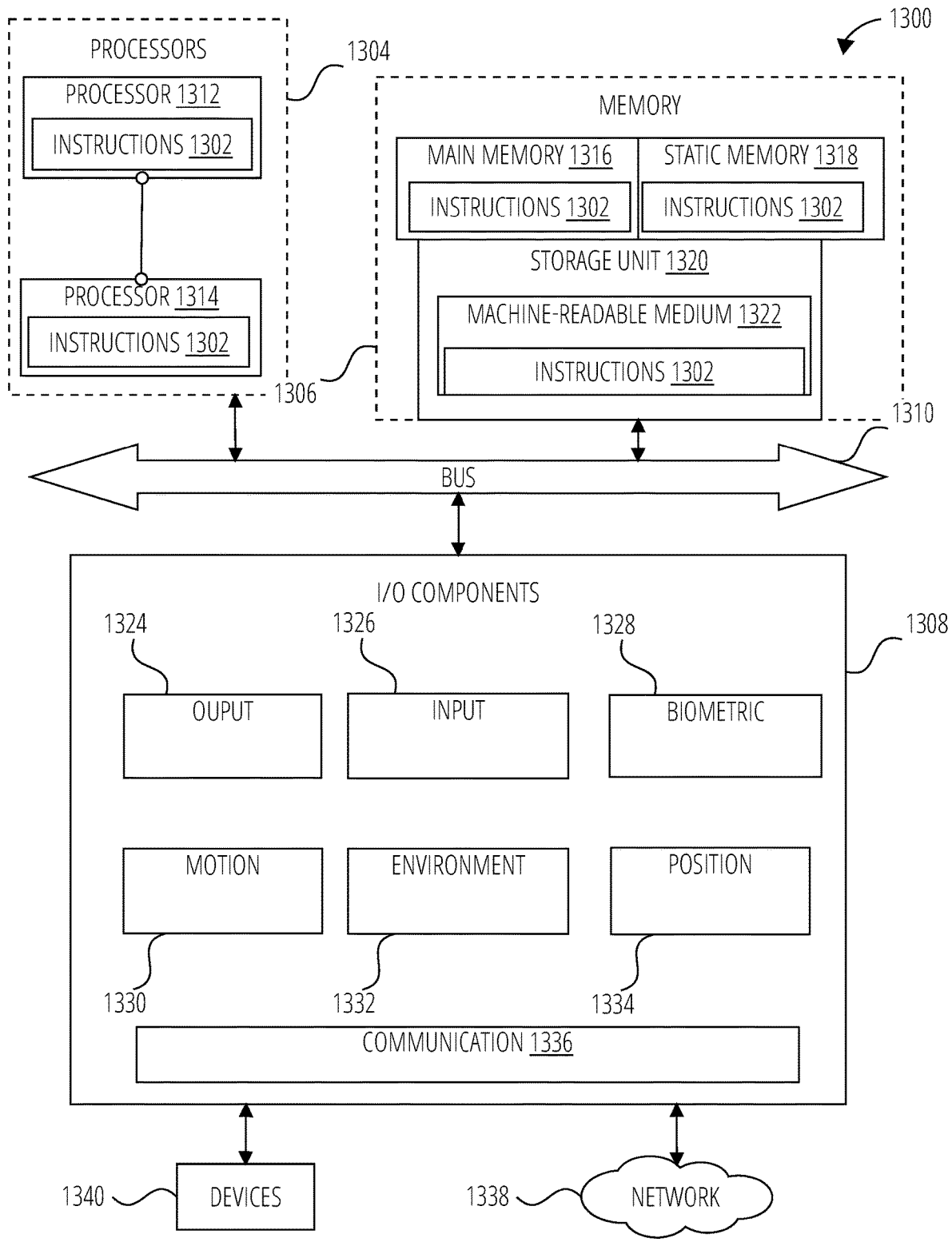
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 (e.g., the safety system described here) within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" may include a collection of machines that individually or jointly execute the instructions 1302 to perform any one or more of the methodologies discussed herein.

The machine 1300 may include processors 1304, memory 1306, and I/O components 1308, which may be configured to communicate via a bus 1310. In some examples, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 1312 and a Processor 1314 that execute the instructions 1302. The term "Processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, wholly or partially, within the main memory 1316, within the static memory 1318, within machine-readable medium 1322 within the storage unit 1320, within the processors 1304 (e.g., within the processor's cache memory), or any suitable combination thereof, during execution thereof by the machine 1300.

The I/O components 1308 may include various components to receive input, provide output, produce output, transmit information, exchange information, or capture measurements. The specific I/O components 1308 included in a particular machine depend on the type of machine. For example, portable machines such as mobile phones may include a touch input device or other such input mechanisms, while a headless server machine will likely not include such a touch input device. The I/O components 1308 may include many other components not shown in FIG. 13. In various examples, the I/O components 1308 may include output components 1324 and input components 1326. The output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 1330 include acceleration sensor components (e.g., accelerometer), gravitation sensor components, rotation sensor components (e.g., gyroscope). The environmental components 1332 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1334 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface Component or another suitable device to interface with the network 1338. In further examples, the communication components 1336 may include wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, or location via detecting an NFC beacon signal that may indicate a particular location.

The various memories (e.g., main memory 1316, static memory 1318, and/or memory of the processors 1304) and/or storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Machine-Learning Pipeline 1500

Figure 14:
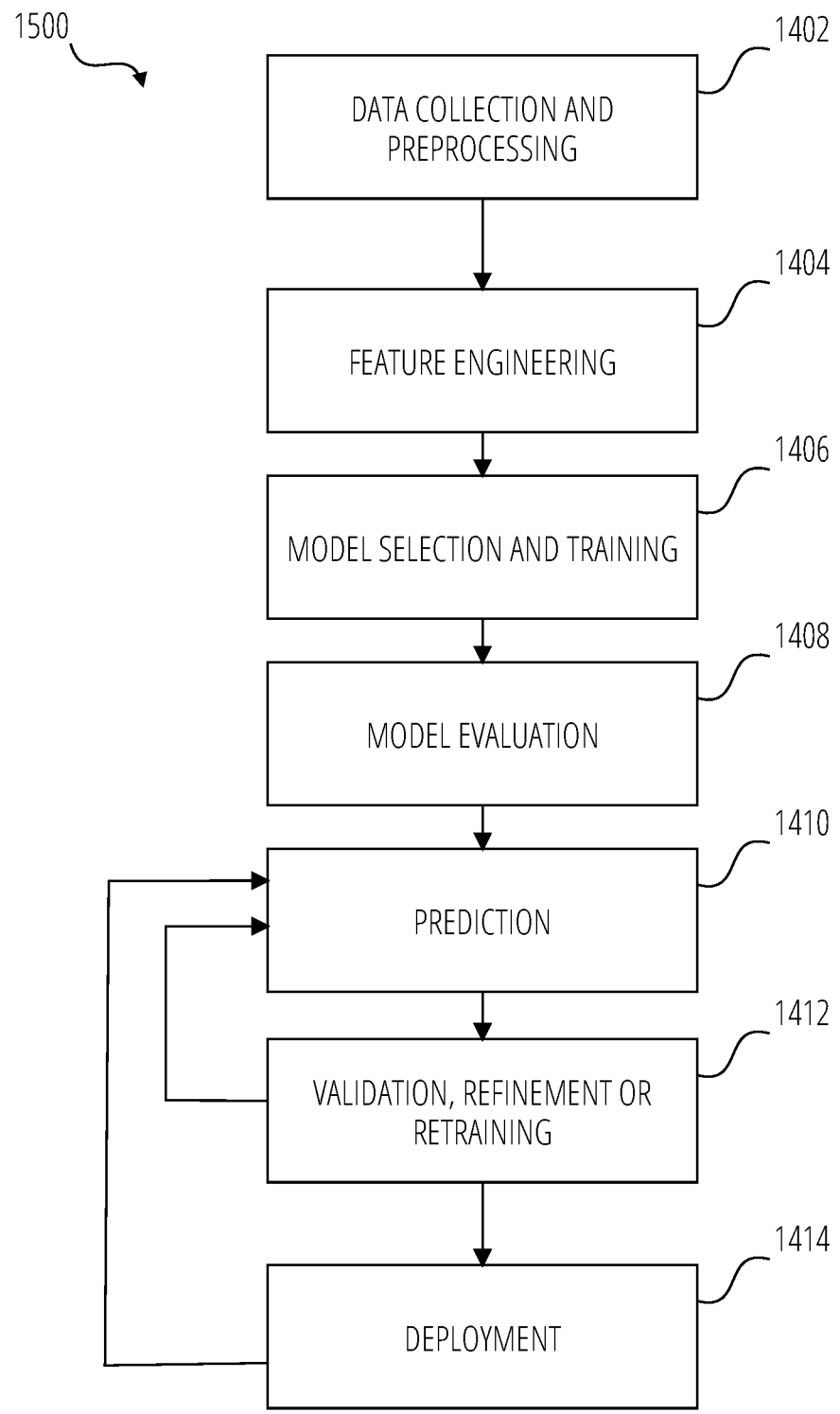
FIG. 14 is a flowchart depicting a machine-learning pipeline, according to some examples, which may be used to train one or more machine learning models used in or with mobility safety systems.

FIG. 14 is a flowchart depicting a machine-learning pipeline 1500, according to some examples, which may be used to train one or more machine learning models used in or with mobility safety systems 104. The machine-learning pipeline 1500 may be used to generate a trained model, for example the trained machine-learning program 1502 of FIG. 15, described herein to perform operations associated with searches and query responses, which can be deployed with a mobility safety system 104

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks.

Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 15:
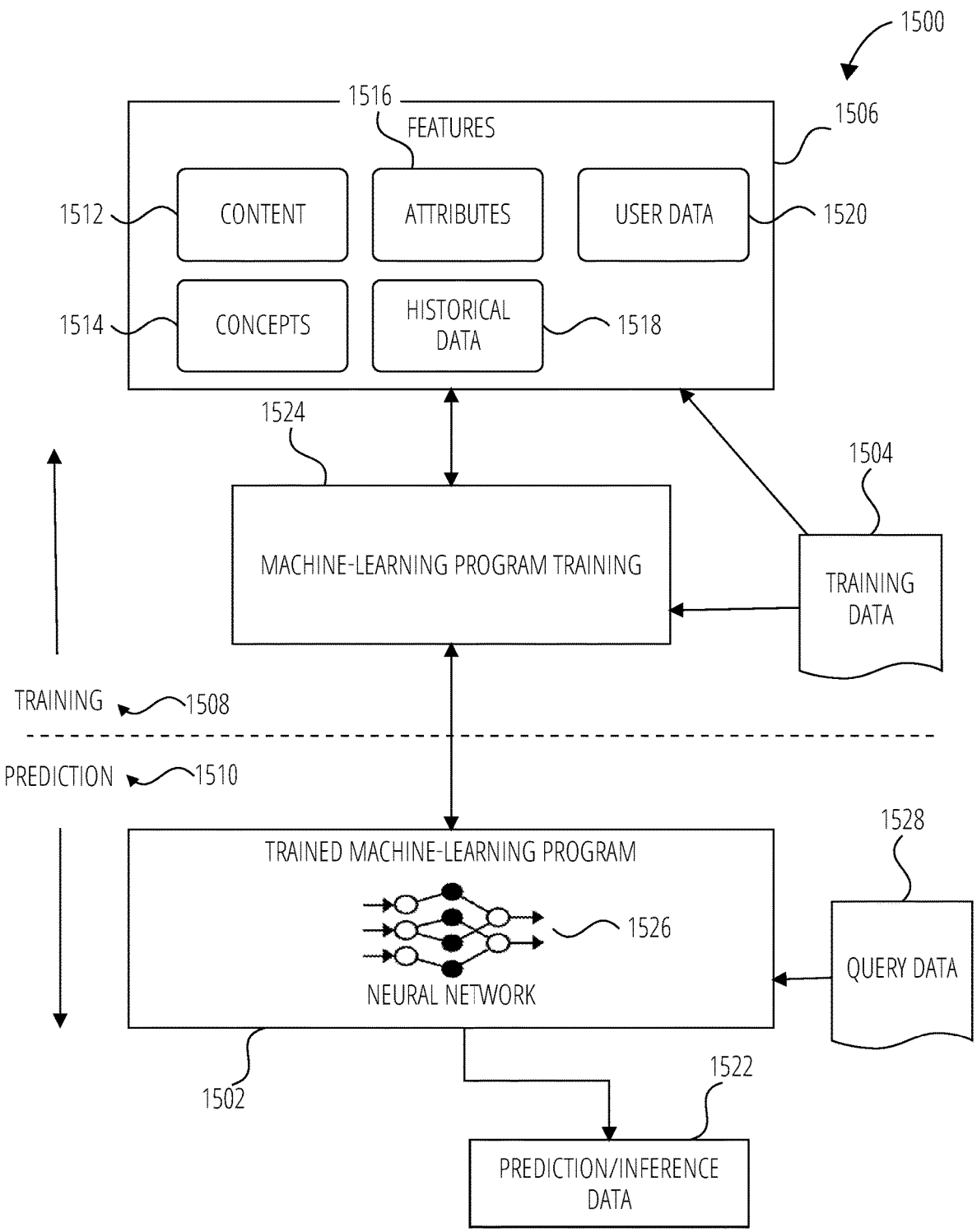
FIG. 15 illustrates training and use of a machine-learning program, according to some examples.

Generating a trained machine-learning program 1502 may include multiple types of phases that form part of the machine-learning pipeline 1500, including for example the following phases illustrated in FIG. 14:

- Data collection and preprocessing 1402: This may include acquiring and cleaning data to ensure that it is suitable for use in the machine learning model. This may also include removing duplicates, handling missing values, and converting data into a suitable format.
- Feature engineering 1404: This may include selecting and transforming the training data 1504 to create features that are useful for predicting the target variable. Feature engineering may include (1) receiving features 1506 (e.g., as structured or labeled data in supervised learning) and/or (2) identifying features 1506 (e.g., unstructured or unlabeled data for unsupervised learning) in training data 1504.
- Model selection and training 1406: This may include selecting an appropriate machine learning algorithm and training it on the preprocessed data. This may further involve splitting the data into training and testing sets, using cross-validation to evaluate the model, and tuning hyperparameters to improve performance.
- Model evaluation 1408: This may include evaluating the performance of a trained model (e.g., the trained machine-learning program 1502) on a separate testing dataset. This can help determine if the model is overfitting or underfitting and if it is suitable for deployment.
- Prediction 1410: This involves using a trained model (e.g., trained machine-learning program 1502) by the prediction component 408 to generate predictions on new, unseen data.
- Validation, refinement or retraining 1412: This may include updating a model based on feedback generated from the prediction phase, such as new data or user feedback.
- Deployment 1414: This may include integrating the trained model (e.g., the trained machine-learning program 1502) into a larger system or application, such as a mobility safety system 104. This can involve setting up APIs, building a user interface, and ensuring that the model is scalable and can handle large volumes of data FIG. 15 illustrates further details two example phases, namely a training phase 1508 (part of the model selection and trainings 1406) and a prediction phase 1510 (part of prediction 1410). Prior to the training phase 1508, feature engineering 1404 is used to identify features 1506. This may include identifying informative, discriminating, and independent features for the effective operation of the trained machine-learning program 1502 in pattern recognition, classification, and regression. In some examples, the training data 1504 includes labeled data, which is known data for pre-identified features 1506 and one or more outcomes. Each of the features 1506 may be a variable or attribute, such as individual measurable property of a process, article, system, or phenomenon represented by a data set (e.g., the training data 1504). Features 1506 may also be of different types, such as numeric features, strings, and graphs, and may include one or more of content 1512, concepts 1514, attributes 1516, historical data 1518 and/or user data 1520, merely for example.

In training phases 1508, the machine-learning pipeline 1500 uses the training data 1504 to find correlations among the features 1506 that affect a predicted outcome or prediction/inference data 1522.

With the training data 1504 and the identified features 1506, the trained machine-learning program 1502 is trained during the training phase 1508 during machine-learning program training 1524. The machine-learning program training 1524 appraises values of the features 1506 as they correlate to the training data 1504. The result of the training is the trained machine-learning program 1502 (e.g., a trained or learned model).

Further, the training phase 1508 may involve machine learning, in which the training data 1504 is structured (e.g., labeled during preprocessing operations), and the trained machine-learning program 1502 implements a relatively simple neural network 1526 capable of performing, for example, classification and clustering operations. In other examples, the training phase 1508 may involve deep learning, in which the training data 1504 is unstructured, and the trained machine-learning program 1502 implements a deep neural network 1526 that is able to perform both feature extraction and classification/clustering operations.

A neural network 1526 may, in some examples, be generated during the training phase 1508, and implemented within the trained machine-learning program 1502. The neural network 1526 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1526 operationally computes a small function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1526 may also be one of a number of different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1508, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

Once a model is fully trained and validated, in a testing phase, the model may be tested on a new dataset that the model has not seen before. The testing dataset is used to evaluate the performance of the model and to ensure that the model has not overfit the training data.

In prediction phase 1510, the trained machine-learning program 1502 uses the features 1506 for analyzing query data 1528 to generate inferences, outcomes or predictions, as examples of a prediction/inference data 1522 (e.g., object estimate data 612, range estimations 610, pose estimations, or a risk estimation). For example, during prediction phase 1510, the trained machine-learning program 1502 is used to generate an output. Query data 1528 is provided as an input to the trained machine-learning program 1502, and the trained machine-learning program 1502 generates the prediction/inference data 1522 as output, responsive to receipt of the query data 1528.

In some examples the trained machine-learning program 1502 may be a generative AI model. Generative AI is a term that may refer to any type of artificial intelligence that can create new content from training data 1504. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1522 that is output include predictions, translations, summaries or media content.

Examples

Example 1 is a method to operate a mobility safety system of a mobility platform, the method comprising: capturing real-time data relating to conditions within a traffic environment; using at least one trained model, generating a risk estimation related to a mobility platform within the traffic environment; and based on the risk estimation, generating a first alert directed at at least an operator of the mobility platform.

In Example 2, the subject matter of Example 1 includes, based on the risk estimation, generating a second alert directed at an operator of a further actor within the traffic environment.

In Example 3, the subject matter of Example 2 includes, the second alert directed at the operator of the further actor within the traffic environment is an audible alert having a loudness exceeding 100 decibels In Example 4, the subject matter of Examples 1-3 includes, based on the risk estimation, selectively recording the real-time data related to the conditions within the traffic environment.

In Example 5, the subject matter of Examples 1-4 includes, based on the risk estimation, selectively performing computations with the mobility safety system.

In Example 6, the subject matter of Examples 1-5 includes, wherein capturing the real-time data relating to the conditions within the traffic environment comprises capturing the real-time data using at least one of a camera to capture image data, a radar sensor to capture radar data, a LiDAR sensor to capture lidar data, a proximity sensor to capture proximity data, an inertial measurement unit (IMU) to capture IMU data, and a global positioning system (GPS) to capture GPS data.

In Example 7, the subject matter of Examples 1-6 includes, wherein the generating of the risk estimation comprises: performing a localization and mapping operation using the real-time data to generate localization and mapping data; performing a perception operation using the real-time data and the localization and mapping data to generate object tracking and range estimation data; performing a prediction operation real-time data using the localization and mapping data and the object tracking and range estimation data to generate prediction data related to the traffic environment; and performing a risk estimation operation, to generate the risk estimation, using the real-time data, the localization and mapping data, the object tracking and range estimation data, and the prediction data.

In Example 8, the subject matter of Examples 1-7 includes, wherein the localization and mapping operation comprises: accessing the real-time data relating to the conditions within the traffic environment; performing an iterative position and orientation estimation for the mobility safety system using at least one of GPS data, IMU data, visual odometry data derived from image data, and a motion model; outputting ego-vehicle position and orientation data related to the mobility safety system.

In Example 9, the subject matter of Example 8 includes, wherein the perception operation comprises: accessing the real-time data relating to the conditions within the traffic environment; accessing the ego-vehicle position and orientation data; performing an object detection operation to identify objects within the traffic environment; performing an orientation estimation operation, responsive to identification of an object within the traffic environment, to estimate an orientation of the detected object; performing a ground surface estimation operation, using the real-time data and environmental map data, to estimate geometry of a ground surface within the traffic environment; performing a range estimation operation, using the estimated geometry of the ground surface and the real-time data, to estimate distances to identify the objects within the traffic environment; and outputting object estimate data based on the estimated orientation, the estimated geometry, and the estimated distances.

In Example 10, the subject matter of Example 9 includes, wherein the prediction operation comprises: accessing the real-time data relating to the conditions within the traffic environment; accessing the ego-vehicle position and orientation data; accessing the object estimate data; performing an object motion prediction to generate object production data; performing an interaction prediction to generate interaction production data; and outputting the prediction data including the object motion prediction data and the interaction prediction data.

In Example 11, the subject matter of Example 10 includes, wherein the risk estimation operation comprises: accessing the real-time data relating to conditions within the traffic environment; accessing the ego-vehicle position and orientation data; accessing the object estimate data; accessing the prediction data; performing a collision estimation operation to generate collision probability data reflecting a probability of a collision between the objects within the traffic environment; performing a collision severity operation to generate collision severity data reflecting a probable severity of the collision between the objects within the traffic environment; performing a predictive collision risk operation to generate predictive collision risk data; and outputting the predictive collision risk data, the predictive collision risk data comprising the risk estimation.

In Example 12, the subject matter of Examples 7-11 includes, wherein each of the localization and mapping operation, the perception operation, the prediction operation, and the risk estimation operation are performed using a respective trained model.

In Example 13, the subject matter of Examples 7-12 includes, wherein two or more of the localization and mapping operation, the perception operation, the prediction operation, and the risk estimation operation are performed using a unified trained model.

In Example 14, the subject matter of Examples 1-13 includes, wherein the at least one trained model is trained using at least one of supervised, unsupervised and semi-supervised learning.

Example 15 is a computing apparatus comprising: at least one processor; and at least one memory storing instructions that, when executed by the at least one processor, configure the apparatus to: capture real-time data relating to conditions within a traffic environment; using at least one trained model, generating a risk estimation related to a mobility platform within the traffic environment; and based on the risk estimation, generating a first alert directed at at least an operator of the mobility platform.

Example 16 is a non-transitory computer-readable storage medium, the computer-readable storage medium including instructions that when executed by at least one computer, cause the at least one computer to: capture real-time data relating to conditions within a traffic environment; using at least one trained model, generating a risk estimation related to a mobility platform within the traffic environment; and based on the risk estimation, generating a first alert directed at at least an operator of the mobility platform.

Example 17 is a mobility safety system comprising: a real-time data capturing component to capture data relating to conditions within a traffic environment using at least one of a camera, a radar sensor, a LiDAR sensor, a proximity sensor, an inertial measurement unit (IMU), and a global positioning system (GPS); at least one trained model to generate a risk estimation related to a mobility platform within the traffic environment, the at least one trained model being trained using at least one of supervised, unsupervised and semi-supervised learning; a risk estimation component configured to generate the risk estimation using the real-time data, a localization and mapping component, a perception component, and a prediction component; an alert activation component configured to generate a first alert directed at an operator of the mobility platform based on the risk estimation, and a second alert directed at an operator of a further actor within the traffic environment; a real-time data recording component configured to selectively record the real-time data related to the conditions within the traffic environment based on the risk estimation; and a computation component configured to selectively perform computations with the mobility safety system based on the risk estimation.

In Example 18, the subject matter of Example 17 includes, wherein the localization and mapping component comprises: an iterative position and orientation estimation component for the mobility safety system using at least one of GPS data, IMU data, visual odometry data derived from image data, and a motion model; and an ego-vehicle position and orientation data output component related to the mobility safety system.

In Example 19, the subject matter of Example 18 includes, wherein the perception component comprises: an object detection component to identify objects within the traffic environment; an orientation estimation component, responsive to identification of an object within the traffic environment, to estimate an orientation of the detected object; a ground surface estimation component, using the real-time data and environmental map data, to estimate geometry of a ground surface within the traffic environment; a range estimation component, using the estimated geometry of the ground surface and the real-time data, to estimate distances to identify the objects within the traffic environment; and an object estimate data output component based on the estimated orientation, the estimated geometry, and the estimated distances.

In Example 20, the subject matter of Example 19 includes, wherein the prediction component comprises: an object motion prediction component to generate object production data; an interaction prediction component to generate interaction production data; and a prediction data output component including the object motion prediction data and the interaction prediction data.

In Example 21, the subject matter of Example 20 includes, wherein the risk estimation component comprises: a collision estimation component to generate collision probability data reflecting a probability of a collision between the objects within the traffic environment; a collision severity component to generate collision severity data reflecting a probable severity of the collision between the objects within the traffic environment; a predictive collision risk component to generate predictive collision risk data; and a predictive collision risk data output component comprising the risk estimation.

In Example 22, the subject matter of Examples 17-21 includes, wherein each of the localization and mapping component, the perception component, the prediction component, and the risk estimation component use a respective trained model.

In Example 23, the subject matter of Examples 17-22 includes, wherein two or more of the localization and mapping component, the perception component, the prediction component, and the risk estimation component use a unified trained model.

Example 24 is at least one machine-readable medium including instructions that, when executed by processing circuitry, cause the processing circuitry to perform operations to implement of any of Examples 1-23.

Example 25 is an apparatus comprising means to implement of any of Examples 1-23.

Example 26 is a system to implement of any of Examples 1-23.

Example 27 is a method to implement of any of Examples 1-23.

Glossary

"Carrier Signal" refers to any intangible medium capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. A decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of methods described herein may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term includes solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium", "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Micromobility platform" is an example of a mobility platform, and may include any small, lightweight, and lower-speed vehicle that is designed for short trips within urban areas. These vehicles are typically powered by human effort or electric motors with a power output below a certain threshold. Examples of micromobility platforms include:
1. Bicycles (both traditional and electric)
2. Scooters (both kick and electric)
3. Skateboards (both traditional and electric)
4. Roller skates and inline skates
5. Segways and other self-balancing devices
6. Electric unicycles
7. Folding bikes and scooters
8. Tricycles (both traditional and electric)
9. Kickbikes and kick scooters
10. Wheelchairs and mobility scooters These vehicles have become increasingly popular in recent years as a means of urban transportation due to their affordability, convenience, and environmental friendliness. Many cities have implemented regulations or established dedicated infrastructure to support the safe use of micromobility platforms on roads, bike lanes, and sidewalks.

"Module" refers to logic having boundaries defined by function or subroutine calls, branch points, Application Program Interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" may o include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method to operate a mobility safety system of a mobility platform, the method comprising: capturing real-time data relating to conditions within a traffic environment; performing a localization and mapping operation based on the real-time data to generate localization and mapping data; performing a perception operation based on the real-time data and the localization and mapping data to generate object tracking and range estimation data; performing a prediction operation based on the real-time data, the localization and mapping data, and the object tracking and range estimation data to generate prediction data related to the traffic environment; using at least one trained model, generating a risk estimation related to the mobility platform within the traffic environment based on the real-time data, the localization and mapping data, the object tracking and range estimation data, and the prediction data; and based on the risk estimation, generating a first alert directed at an operator of the mobility platform.

2. The method of claim 1, based on the risk estimation, generating a second alert directed at an operator of a further actor within the traffic environment.

3. The method of claim 2, wherein the second alert directed at the operator of the further actor within the traffic environment is an audible alert having a loudness exceeding 100 decibels.

4. The method of claim 1, comprising, based on the risk estimation, selectively recording the real-time data related to the conditions within the traffic environment.

5. The method of claim 1, comprising, based on the risk estimation, selectively performing computations with the mobility safety system.

6. The method of claim 1, wherein capturing the real-time data relating to the conditions within the traffic environment comprises capturing the real-time data using at least one of a camera to capture image data, a radar sensor to capture radar data, a LiDAR sensor to capture lidar data, a proximity sensor to capture proximity data, an inertial measurement unit (IMU) to capture IMU data, and a global positioning system (GPS) to capture GPS data.

7. The method of claim 1, wherein the localization and mapping operation comprises:
    accessing the real-time data relating to the conditions within the traffic environment;
    performing an iterative position and orientation estimation for the mobility safety system using at least one of GPS data, IMU data, visual odometry data derived from image data, and a motion model; and
    outputting ego-vehicle position and orientation data related to the mobility safety system.

8. The method of claim 7, wherein the perception operation comprises:
    accessing the real-time data relating to the conditions within the traffic environment;
    accessing the ego-vehicle position and orientation data;
    performing an object detection operation to identify objects within the traffic environment;
    performing an orientation estimation operation, responsive to identification of an object within the traffic environment, to estimate an orientation of the identified object;
    performing a ground surface estimation operation, using the real-time data and environmental map data, to estimate geometry of a ground surface within the traffic environment;
    performing a range estimation operation, using the estimated geometry of the ground surface and the real-time data, to estimate distances to identify the objects within the traffic environment; and
    outputting object estimate data based on the estimated orientation, the estimated geometry, and the estimated distances.

9. The method of claim 8, wherein the prediction operation comprises:
    accessing the real-time data relating to the conditions within the traffic environment;
    accessing the ego-vehicle position and orientation data;
    accessing the object estimate data;
    performing an object motion prediction to generate object motion prediction data;
    performing an interaction prediction to generate interaction prediction data; and
    outputting the prediction data including the object motion prediction data and the interaction prediction data.

10. The method of claim 9, wherein the generating of the risk estimation comprises:
    accessing the real-time data relating to conditions within the traffic environment;
    accessing the ego-vehicle position and orientation data;
    accessing the object estimate data;
    accessing the prediction data;
    performing a collision estimation operation to generate collision probability data reflecting a probability of a collision between the objects within the traffic environment;
    performing a collision severity operation to generate collision severity data reflecting a probable severity of the collision between the objects within the traffic environment;
    performing a predictive collision risk operation to generate predictive collision risk data; and
    outputting the predictive collision risk data, the predictive collision risk data comprising the risk estimation.

11. The method of claim 1, wherein each of the localization and mapping operation, the perception operation, the prediction operation, and the risk estimation are performed using a respective trained model.

12. The method of claim 1, wherein two or more of the localization and mapping operation, the perception operation, the prediction operation, and the risk estimation are performed using a unified trained model.

13. The method of claim 1, wherein the at least one trained model is trained using at least one of supervised, unsupervised and semi-supervised learning.

14. A computing apparatus comprising: at least one processor; and at least one memory storing instructions that, when executed by the at least one processor, configure the computing apparatus to perform operations comprising: capturing real-time data relating to conditions within a traffic environment; performing a localization and mapping operation based on the real-time data to generate localization and mapping data; performing a perception operation based on the real-time data and the localization and mapping data to generate object tracking and range estimation data; performing a prediction operation based on the real-time data, the localization and mapping data, and the object tracking and range estimation data to generate prediction data related to the traffic environment; using at least one trained model, generating a risk estimation related to a mobility platform within the traffic environment based on the real-time data, the localization and mapping data, the object tracking and range estimation data, and the prediction data; and based on the risk estimation, generating a first alert directed at an operator of the mobility platform.

15. A non-transitory computer-readable storage medium, the non-transitory computer-readable storage medium including instructions that when executed by at least one computer, cause the at least one computer to perform operation comprising: capturing real-time data relating to conditions within a traffic environment; performing a localization and mapping operation based on the real-time data to generate localization and mapping data; performing a perception operation based on the real-time data and the localization and mapping data to generate object tracking and range estimation data; performing a prediction operation based on the real-time data, the localization and mapping data, and the object tracking and range estimation data to generate prediction data related to the traffic environment; using at least one trained model, generating a risk estimation related to a mobility platform within the traffic environment based on the real-time data, the localization and mapping data, the object tracking and range estimation data, and the prediction data; and based on the risk estimation, generating a first alert directed at an operator of the mobility platform.

16. A mobility safety system comprising:
- a real-time data capturing component to capture data relating to conditions within a traffic environment using at least one of a camera, a radar sensor, a LiDAR sensor, a proximity sensor, an inertial measurement unit (IMU), and a global positioning system (GPS);
- a unified trained model to perform operations comprising:
  - a localization and mapping operation based on real-time data to generate localization and mapping data;
  - a perception operation based on the real-time data and the localization and mapping data to generate object tracking and range estimation data; and
  - a prediction operation based on the real-time data, the localization and mapping data, and the object tracking and range estimation data to generate prediction data related to the traffic environment, the unified trained model being trained using at least one of supervised, unsupervised and semi-supervised learning;
- at least one processor configured to generate a risk estimation using the unified trained model; and
- one or more alert mechanisms to generate a first alert directed at an operator of a mobility platform based on the risk estimation.

\* \* \* \* \*